US009235208B2

(12) United States Patent
Herzog

(10) Patent No.: US 9,235,208 B2
(45) Date of Patent: *Jan. 12, 2016

(54) SYSTEM OF SEQUENTIAL KERNEL REGRESSION MODELING FOR FORECASTING FINANCIAL DATA

(71) Applicant: GE Intelligent Platforms, Inc, Charlottesville, VA (US)

(72) Inventor: James Paul Herzog, Downers Grove, IL (US)

(73) Assignee: GE INTELLIGENT PLATFORMS, INC, Charlottesville, VA (US)

( * ) Notice: Subject to any disclaimer, the term of this patent is extended or adjusted under 35 U.S.C. 154(b) by 284 days.

This patent is subject to a terminal disclaimer.

(21) Appl. No.: 13/646,367

(22) Filed: Oct. 5, 2012

(65) Prior Publication Data

US 2013/0031019 A1    Jan. 31, 2013

Related U.S. Application Data

(63) Continuation-in-part of application No. 13/186,153, filed on Jul. 19, 2011, now abandoned.

(51) Int. Cl.
*G06F 9/44*    (2006.01)
*G05B 23/02*    (2006.01)

(52) U.S. Cl.
CPC .................................. *G05B 23/0243* (2013.01)

(58) Field of Classification Search
None
See application file for complete search history.

(56) References Cited

U.S. PATENT DOCUMENTS

| 5,748,469 | A | 5/1998 | Pyotsiae |
| 7,313,550 | B2 * | 12/2007 | Kulkarni et al. ................ 706/21 |
| 8,620,853 | B2 | 12/2013 | Herzog |
| 2002/0128751 | A1 | 9/2002 | Engstrom et al. |
| 2006/0036403 | A1 * | 2/2006 | Wegerich et al. ............ 702/183 |
| 2008/0052040 | A1 | 2/2008 | Renner |

(Continued)

FOREIGN PATENT DOCUMENTS

| EP | 1724717 A2 | 11/2006 |
| EP | 2204778 A2 | 7/2010 |

OTHER PUBLICATIONS

Gilboa et al. A similarity-based approach to prediction. Journal of Econometrics, vol 162, 2011, pp. 124-131. Available Online Oct. 29, 2009.*

(Continued)

*Primary Examiner* — Jeffrey A Gaffin
*Assistant Examiner* — David H Kim
(74) *Attorney, Agent, or Firm* — GE Global Patent Operation

(57) ABSTRACT

A monitoring system for determining the future behavior of a financial system includes an empirical model to receive reference data that indicates the normal behavior of the system and input pattern arrays. Each input pattern array has a plurality of input vectors, while each input vector represents a time point and has input values representing a plurality of parameters indicating the current condition of the system. The model generates estimate values based on a calculation that uses an input pattern array and the reference data to determine a similarity measure between the input values and reference data. The estimate values, in the form of an estimate matrix, include at least one estimate vector of inferred estimate values, and represents at least one time point that is not represented by the input vectors. The inferred estimate values are used to determine a future behavior of the financial system.

19 Claims, 7 Drawing Sheets

(56) References Cited

U.S. PATENT DOCUMENTS

| | | |
|---|---|---|
| 2008/0183425 A1 | 7/2008 | Hines |
| 2010/0274745 A1 | 10/2010 | Seo et al. |
| 2013/0024166 A1 | 1/2013 | Herzog |
| 2013/0024415 A1 | 1/2013 | Herzog |
| 2013/0024416 A1* | 1/2013 | Herzog ............................ 706/52 |
| 2013/0031019 A1* | 1/2013 | Herzog ........................ 705/348 |
| 2013/0054414 A1 | 2/2013 | Tarnanen |

OTHER PUBLICATIONS

Gilboa et al. Empirical Similarity. The Review of Economics and Statistics, vol. 88, No. 3 (Aug. 2006), pp. 433-444.*

Wilks et al., "Monitoring your Equipment", Data Systems, pp. 1-14, 2004.

Sapankevych, "Time Series Prediction Using Support Vector Machines: A Survey", Computational Intelligence Magazine, IEEE, vol. No. 04, Issue No. 02, May 2009.

* cited by examiner

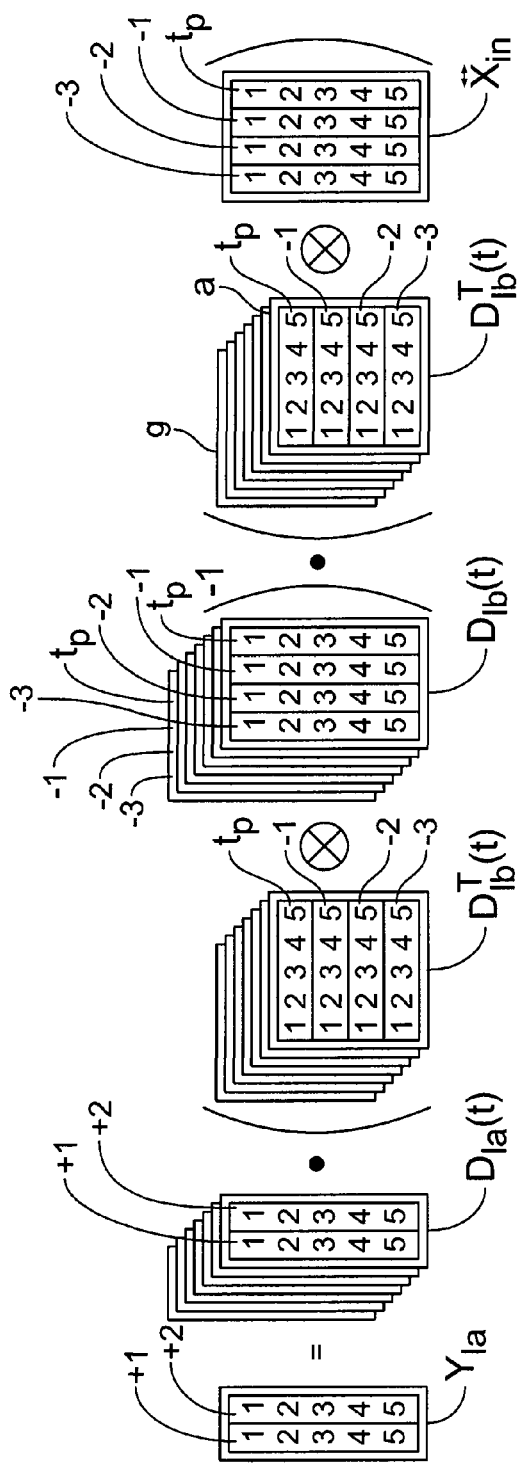
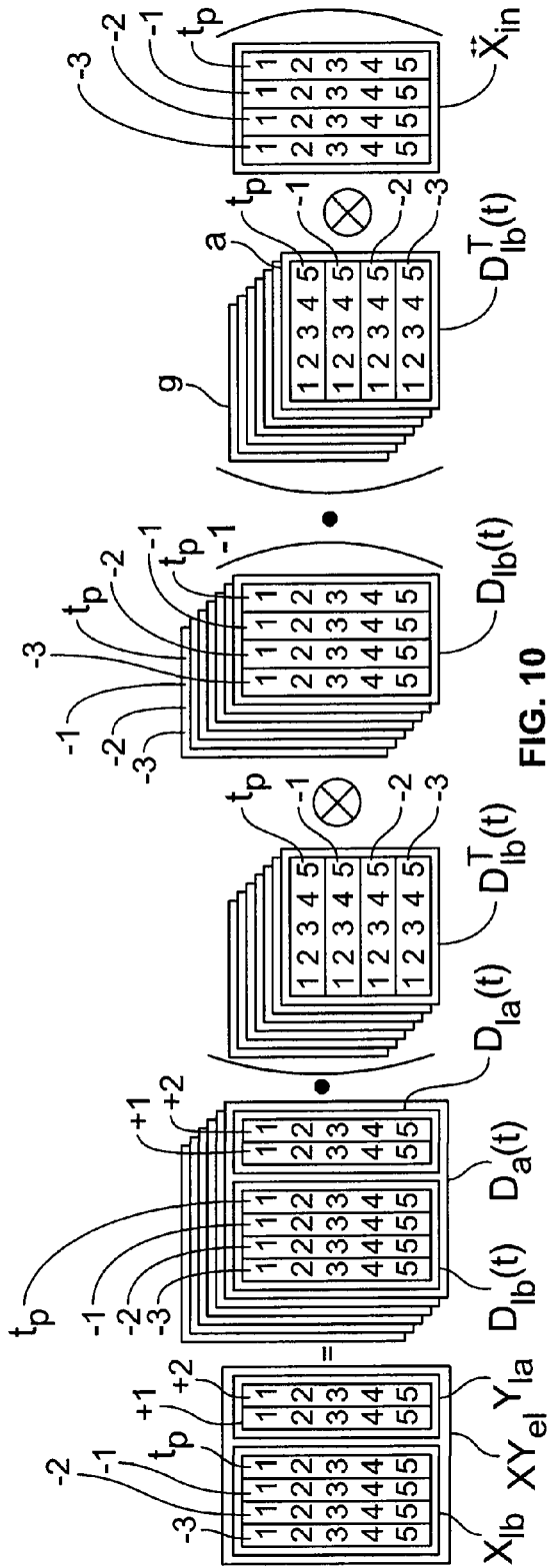
FIG. 9
FIG. 10

SYSTEM OF SEQUENTIAL KERNEL REGRESSION MODELING FOR FORECASTING FINANCIAL DATA

CROSS-REFERENCE TO RELATED APPLICATION

This application is a continuation-in-part of U.S. patent application Ser. No. 13/186,153, filed Jul. 19, 2011, which is hereby incorporated by reference in its entirety.

BACKGROUND OF THE INVENTION

1. Field of the Invention

The subject matter disclosed herein relates generally to the field of kernel regression modeling used for forecasting of financial time series data, and more particularly to the use of multivariate kernel regression models for forecasting of correlated financial parameters.

2. Brief Description of the Related Art

Kernel regression is a form of modeling used to determine a non-linear function or relationship between values in a dataset and is used to monitor machines or systems to determine the condition of the machine or system. One known form of kernel regression modeling is similarity-based modeling (SBM) disclosed by U.S. Pat. Nos. 5,764,509 and 6,181,975. For SBM, multiple sensor signals measure physically correlated parameters of a machine, system, or other object being monitored to provide sensor data. The parameter data may include the actual or current values from the signals or other calculated data whether or not based on the sensor signals. The parameter data is then processed by an empirical model to provide estimates of those values. The estimates are then compared to the actual or current values to determine if a fault exists in the system being monitored.

More specifically, the model generates the estimates using a reference library of selected historic patterns of sensor values representative of known operational states. These patterns are also referred to as vectors, snapshots, or observations, and include values from multiple sensors or other input data that indicate the condition of the machine being monitored at an instant in time. In the case of the reference vectors from the reference library, the vectors usually indicate normal operation of the machine being monitored. The model compares the vector from the current time to a number of selected learned vectors from known states of the reference library to estimate the current state of the system. Generally speaking, the current vector is compared to a matrix made of selected vectors from the reference library to form a weight vector. In a further step, the weight vector is multiplied by the matrix to calculate a vector of estimate values. The estimate vector is then compared to the current vector. If the estimate and actual values in the vectors are not sufficiently similar, this may indicate a fault exists in the object being monitored.

However, this kernel regression technique does not explicitly use the time domain information in the sensor signals, and instead treats the data in distinct and disconnected time-contemporaneous patterns when calculating the estimates. For instance, since each current vector is compared to the reference library vectors individually, it makes no difference in what order the current vectors are compared to the vectors of the reference library—each current vector will receive its own corresponding estimate vector.

Some known models do capture time domain information within a kernel regression modeling construct. For example, complex signal decomposition techniques convert time varying signals into frequency components as disclosed by U.S. Pat. Nos. 6,957,172 and 7,409,320, or spectral features as disclosed by U.S. Pat. No. 7,085,675. These components or features are provided as individual inputs to the empirical modeling engine so that the single complex signal is represented by a pattern or vector of frequency values that occur at the same time. The empirical modeling engine compares the extracted component inputs (current or actual vector) against expected values to derive more information about the actual signal or about the state of the system generating the time varying signals. These methods are designed to work with a single periodic signal such as an acoustic or vibration signal. But even with the system for complex signals, the time domain information is not important when calculating the estimates for the current vector since each current vector is compared to a matrix of vectors with reference or expected vectors regardless of the time period that the input vectors represent.

BRIEF DESCRIPTION OF THE INVENTION

In one aspect, a method for determining the future behavior of a financial system includes obtaining reference data that indicates the historic behavior state of the system, and obtaining input pattern arrays. Each input pattern array has a plurality of input vectors, while each input vector represents a time point and has input values representing a plurality of parameters indicating the current condition of the system. At least one processor generates estimate values based on a calculation that uses an input pattern array and the reference data to determine a similarity measure between the input values and reference data. The estimate values, in the form of an estimate matrix, include at least one estimate vector of virtual or inferred estimate values, and represent at least one time point that is not represented by the input vectors. The inferred estimate values are used to determine a future condition of the system.

In another aspect, a monitoring system for determining the behavior of a financial system has an empirical model module configured to receive reference data that indicates the historic behavior of the system, receive input pattern arrays where each input pattern array has a plurality of input vectors. Each input vector represents a time point and has input values representing a plurality of parameters indicating the current condition of the system. The empirical model is also configured to generate estimate values based on a calculation that uses an input pattern array and the reference data to determine a similarity measure between the input values and reference data. The estimate values are in the form of an estimate matrix that includes estimate vectors of inferred estimate values, and each estimate matrix represents at least one time point that is not represented by the input vectors. A forecasting module is configured to use the inferred estimate values to determine the future behavior of the system.

BRIEF DESCRIPTION OF THE DRAWINGS

FIG. 9 is a schematic diagram of an inferential sequential similarity based modeling equation that extrapolates in the time dimension;

FIG. 10 is a schematic diagram of an inferential sequential similarity based modeling equation that extrapolates in the time dimension.

DETAILED DESCRIPTION OF THE INVENTION

It has been determined that the accuracy of the estimates in a kernel regression model, and specifically a similarity based model, can be substantially improved by incorporating time domain information into the model. Thus, one technical effect of the present monitoring system and method is to generate estimate data by capturing time domain information from the large numbers of periodic and non-periodic signals that monitor financial instruments, entities (e.g., companies), markets, and economies. The technical effect of the present system also is to operate an empirical model that extends the fundamental non-linear mathematics at the core of kernel regression modeling from a vector-to-vector operation to a matrix-to-matrix (or array-to-array) operation as explained in detail below. Another alternative technical effect of the monitoring system and method is to generate virtual or inferred estimate values for future time points to determine a future condition of the financial system being monitored.

Figure 1:
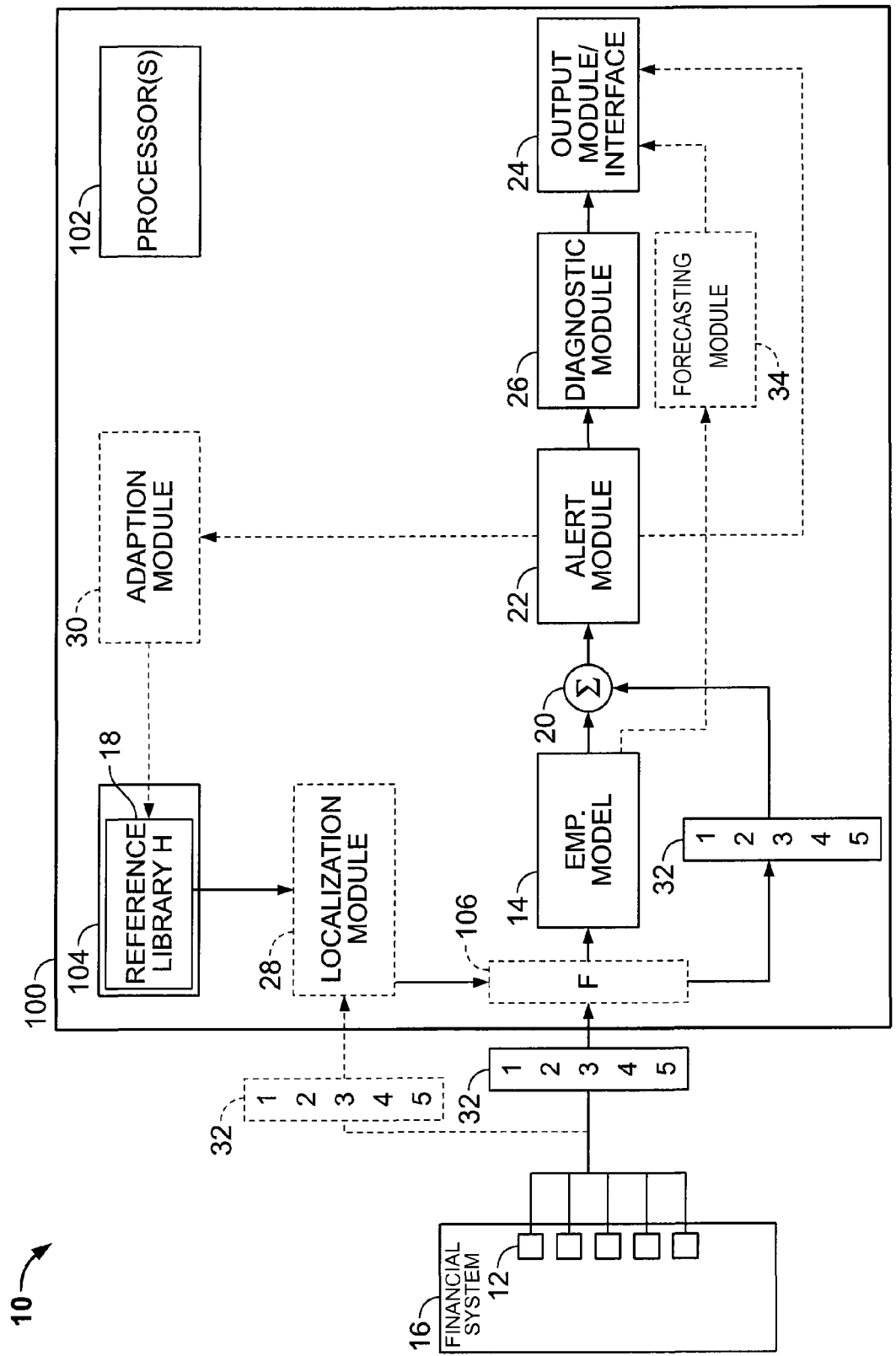
FIG. 1 shows a block diagram of an example arrangement of a monitoring system.

Referring to FIG. 1, a monitoring system 10 incorporating time domain information can be embodied in a computer program in the form of one or more modules and executed on one or more computers 100 and by one or more processors 102. The computer 100 may have one or more memory storage devices 104, whether internal or external, to hold financial data and/or the computer programs whether permanently or temporarily. In one form, a standalone computer runs a program dedicated to receiving financial data from financial data vendors who provide data that most typically covers information about entities (companies) and instruments which companies might issue. The types of financial instrument data provided by the vendors include, but are not limited to, price, volume, and other transaction data for various financial instruments, such as stocks, bonds, funds, options, futures, currencies, and other derivatives. The types of data on entities include data on corporate actions and events, valuation information, and other fundamental data that characterize company performance. The data are delivered either in a streaming format, or as snapshot files of streamed data, or as "end of day" files showing the position at the close of business of a certain market or region. The financial data may be transmitted through wires or wirelessly over a computer network or the internet, for example, to the computer or database performing the data collection. One computer with one or more processors may perform all of the monitoring tasks for all of the modules, or each task or module may have its own computer or processor performing the module. Thus, it will be understood that processing may take place at a single location or the processing may take place at many different locations all connected by a wired or wireless network.

Figure 2:
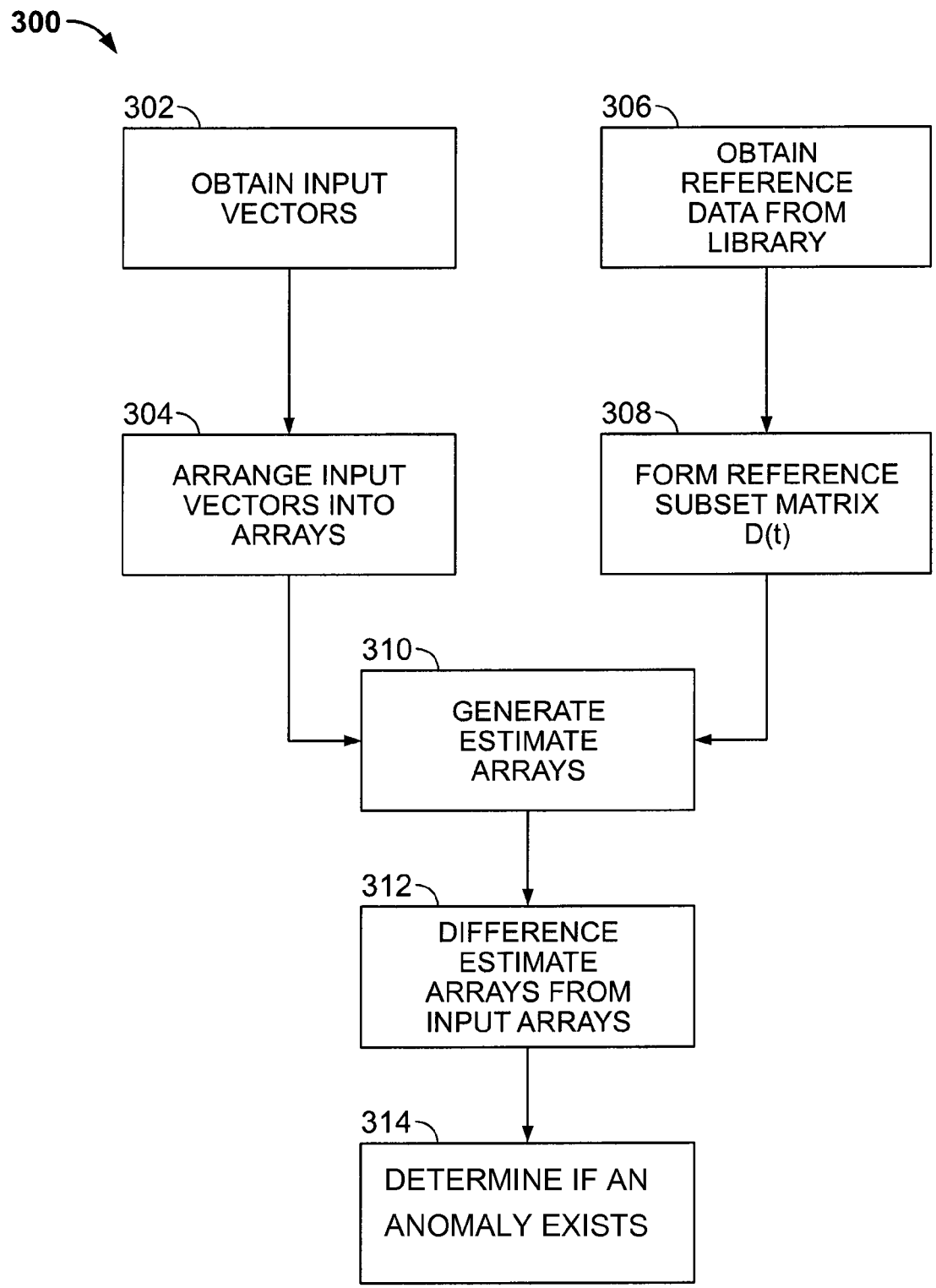
FIG. 2 is flow chart showing the basic process for the monitoring system.

Referring to FIG. 2, in the process (300) performed by the monitoring system 10, the system receives data or signals 12 from financial data vendors for a financial system 16 being monitored such as that described above. This data is arranged into input vectors 32 for use by the model 14. Herein, the terms input, actual, and current are used interchangeably, and the terms vector, snapshot, and observation are used interchangeably. The input vector (or actual snapshot for example) represents the state of the system being monitored at a single moment in time.

Additionally, or alternatively, the input vector 32 may include calculated data that may or may not have been calculated based on data provided by financial data vendors. This may include, for example, simple time differencing of a financial signal or the simple return of an asset price signal. The input vector 32 may also have values representing other financial variables not represented by the data provided by financial data vendors. This may be, for example, non-published internal business data.

The model 14 obtains (302) the data in the form of the vectors 32 and arranges (304) the input vectors into an input array or matrix. It will be understood, however, that the model 14 itself may form the vectors 32 from the input data, or receive the vectors from a collection or input computer or processor that organizes the data into the vectors and arrays. Thus, the input data may be arranged into vector 32 by computer 100, another computer near location of computer 100, or at another location such as near the financial system 16.

The model 14 also obtains (306) reference data in the form of reference vectors or matrices from reference library 18 and sometimes referred to as a matrix H. The library 18 may include all of the historical reference vectors in the system. The model 14 then uses the reference data and input arrays to generate estimates (310) in the form of a resulting estimate matrix or array. The estimate matrix is provided to a differencing module 20 that determines (312) the difference (or residual) between the estimate values in the estimate matrix and corresponding input values in the input array. The residuals are then analyzed by an alert or anomaly analysis module (or just alert module) 22. The technical effect is to determine (314) if the financial system is displaying anomalous behavior, by which it is meant that the current behavior of the financial system has departed significantly from past behavior. If the financial system being monitored includes signals that measure credit card activity or trading action (e.g., bid/ask price, trade volume, etc.), then the anomalous behavior could be due to identify theft or the actions of a rogue trader. These examples are representative of other causes or actions that one of ordinary skill in the art of financial systems analysis would understand to be detected as statistical anomalies in financial systems.

As shown in dashed line, the monitoring system 10 also may have a Localization Module 28 that changes which data from the reference library is used to form (308) a subset or matrix D(t) (referred to as a three-dimensional collection of learned sequential pattern matrices below (FIG. 6)) to compare to the vectors in each input array. Otherwise, the matrix D(t) of reference data may remain the same for all of the input matrices as explained in detail below. Also, the monitoring system may have an adaption module 30 that continuously places the input vectors into the reference library to update the data in the library or when a certain event occurs, such as when the model receives data that indicates new behavior of the system not observed before, for example. This is also described in detail below.

The alert module 22 may provide alerts as well as the residuals directly to an interface or output module 24. The technical effect is to enable users to perform their own diagnostic analysis, or a diagnostic module 26, if provided, to analyze the exact nature of the cause of the anomalous behavior to the user through the output module 24.

The output module 24 may include mechanisms for displaying these results (for example, computer screens, PDA screens, print outs, or web server), mechanisms for storing the results (for example, a database with query capability, flat file, XML file), and/or mechanisms for communicating the results to a remote location or to other computer programs (for example, software interface, XML datagram, email data packet, asynchronous message, synchronous message, FTP file, service, piped command and the like).

A more detailed explanation of the empirical model 14 requires certain knowledge of kernel regression. In pattern recognition techniques such as kernel regression, a pattern consists of input data (as described above) grouped together as a vector. The data for each vector is collected from a system at a common point in time. Here, however, and as explained in greater detail below, the pattern (vector) of contemporaneous data values associated with existing kernel regression methods is augmented with temporally-related information such as sequential patterns from successive moments in time or the output from time-dependent functions (for example, filters, time-derivatives and so forth) applied to the patterns from successive moments in time. Therefore, the individual patterns (vectors) processed by traditional kernel regression methods are replaced by temporally-related sequences of patterns that form an array (or simply pattern arrays or pattern matrices).

All kernel-based modeling techniques, including kernel regression, radial basis functions, and similarity-based modeling, can be described by the equation:

$$x_{est} = \sum_{i=1}^{L} c_i K(x_{new}, x_i) \quad (1)$$

where a vector $x_{est}$ of financial signal or financial parameter estimates is generated as a weighted sum of results of a kernel function K, which compares the input vector $x_{new}$ of financial parameters to L learned patterns of financial data, $x_i$. $x_i$ is formed of reference or learned data in the form of vectors (also referred to as observations, patterns, snapshots, or exemplars). The kernel function results are combined according to weights which may be in the form of vectors and can be determined in a number of ways. The above form is an "autoassociative" form, in which all estimated output signals are also represented by input signals. In other words, for each input value, an estimate value is calculated. This contrasts with the "inferential" form in which certain estimate output values do not represent an existing input value, but are instead inferred from the inputs:

$$y_{est} = \sum_{i=1}^{L} c_i K(x_{new}, x_i) \quad (2)$$

where in this case, $y_{est}$ is an inferred financial parameter estimate obtained from the kernel-based comparison of the input vectors $x_{new}$ of other parameters to the L learned exemplars $x_i$ of those parameters. Each learned exemplar $x_i$ is associated with another exemplar vector $y_i$ of the parameters to be estimated, which are combined in a weighted fashion according to the kernel K and vectors $c_i$ (which are functions at least in part of the $y_i$) to predict output vest. In a similar fashion, more than one financial parameter can be simultaneously inferred.

What is common to the kernel-based estimators is the kernel function, and the generation of a result from a linear combination of exemplars (for example, a matrix of the exemplars or vectors), based on the kernel results and the vectors $c_i$ that embodies the exemplars. Kernel function K is a generalized inner product, but in one form has the further characteristic that its absolute value is maximum when $x_{new}$ and $x_i$ are identical.

According to one embodiment of the invention, a kernel-based estimator that can be used to provide the model is Kernel Regression, exemplified by the Nadaraya-Watson kernel regression form:

$$y_{est} = \frac{\sum_{i=1}^{L} y_i^{out} K(x_{new}, x_i^{in})}{\sum_{i=1}^{L} K(x_{new}, x_i^{in})} \quad \text{(Inferential form)} \quad (3)$$

$$x_{est} = \frac{\sum_{i=1}^{L} x_i K(x_{new}, x_i)}{\sum_{i=1}^{L} K(x_{new}, x_i)} \quad \text{(Autoassociative form)} \quad (4)$$

In the inferential form, a multivariate estimate of inferred parameters $y_{est}$ is generated from the results of the kernel K operator on the input vector of financial parameter values $x_{new}$ and the L learned exemplars $x_i$, linearly combined according to respective learned vectors $y_i$, which are each associated with each $x_i$, and normalized by the sum of kernel results. The $y_i$ represent the L sets of learned data for the parameters in Y, which were associated with (such as, measured contemporaneously with) the learned data of parameters in X. By way of example, X may comprise a plurality of market indices, while Y may represent a corresponding plurality of equity prices for group of competing companies traded in the markets. In other words, the market indices may be used to calculate weights which are then used in a calculation with $y_i$ (the reference vector with previous values of the missing parameter) to calculate estimated equity prices for the group of companies as $y_{est}$.

In the autoassociative form of the kernel regression, a multivariate estimate of parameters $x_{est}$ is generated by a normalized linear combination of the learned measurements of those parameters $x_i$ (for example, in the form of a matrix D of exemplars described below), multiplied by the kernel operation results for the input vector $x_{new}$ vis-à-vis the learned observations $x_i$.

In kernel regression for the present example, the $c_i$ from equations 1 and 2 above are composed of the learned exemplars normalized by the sum of the kernel comparison values. The estimate vectors, $y_{est}$ or $x_{est}$, comprise a set of estimated parameters that are, according to one example, differenced with actual measured values ($x_{new}$, or $y_{new}$, which is not input to the model in the inferential case) to provide residuals.

In a specific example of Kernel regression, a similarity-based model (SBM) can be used as the model according to the present invention. Whereas the Nadaraya-Watson kernel regression provides estimates that are smoothed estimates given a set of (possibly noisy) learned exemplars, SBM provides interpolated estimates that fit the learned exemplars when they also happen to be the input as well, such as if the input vector is identical to one of the learned exemplars. This can be advantageous in detecting deviations in parameters, since noise in these signals will be overfit to a certain extent (if noise was similarly present on the exemplars from which the model was made), thus removing the noise somewhat from the residuals as compared to the Nadaraya-Watson kernel regression approach. SBM can be understood as a form of kernel-based estimator by rewriting the kernel function K as the operator $\otimes$, and equating the set of learned exemplars $x_i$ as a matrix D with the elements of $x_i$ forming the rows, and the $x_i$ observations forming its columns. Then:

$$K_{i=1}^L(x_i, x_{new}) = (D^T \otimes x_{new}) \quad (5)$$

where D has been transposed, which results in a column vector of kernel values, one for each observation $x_i$ in D. Similarly, the comparison of all exemplars with each other can be represented as:

$$K_{i,j=1}^L(x_i, x_j) = (D^T \otimes D) \quad (6)$$

Figure 3:
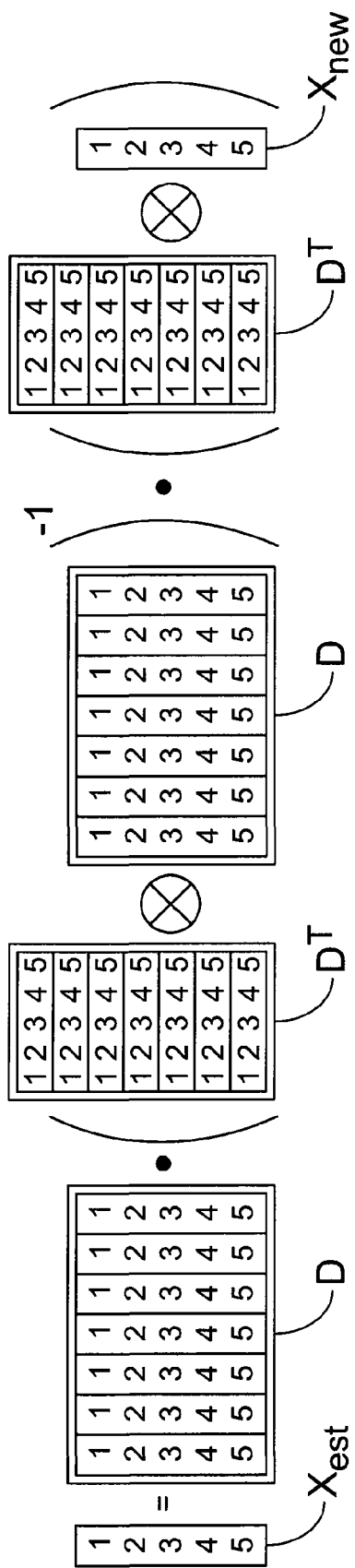
FIG. 3 is a schematic diagram of the autoassociative similarity based modeling equation.

Then, the autoassociative form of SBM generates an estimate vector according to:

$$x_{est} = D \cdot (D^T \otimes D)^{-1} \cdot (D^T \otimes x_{new}) \quad (7)$$

where $x_{est}$ is the estimate vector, $x_{new}$ is the input observation, and D is a learned vector matrix comprising the set (or subset) of the learned exemplary observations of the parameters. The similarity operator or kernel is signified by the symbol $\otimes$, and has the general property of rendering a similarity score for the comparison of any two vectors from each of the operands. Thus, the first term $(D^T \otimes D)$ would yield a square matrix of values of size equal to the number of observations in D as shown in equation (6) above. The term $(D^T \otimes x_{new})$ would yield a vector of similarity values, one similarity value for each vector in D as shown in equation 5. This similarity operator is discussed in greater detail below. The equation is shown schematically on FIG. 3 and shows how each component of the equation is formed by vectors as represented by the rectangular boxes. In this example, each vector contains financial data for parameters 1-5 (although this could also include other calculated data as described above). It will be understood that the numbers 1-5 indicate which financial parameter is being represented and not the particular data value. Thus, the data value itself will be different for the different parts of the equation (for example, the value for parameter 1 may be different in $x_{new}$ versus that in D versus that in $x_{est}$).

It will also be understood that for equation (7), time domain information among a group of input vectors is ignored to generate estimates. In other words, since equation (7) generates an estimate vector by using a single input vector $x_{new}$, the order in which the vectors in a group of input vectors are analyzed to generate estimate vectors is largely unimportant. If a certain order related to time (such as sequential) is needed later in the process to determine if an anomaly exists or to diagnose the cause of the anomalous behavior, then the vectors can be ordered as desired after generating the estimates.

The estimate can further be improved by making it independent of the origin of the data, according to the following equation, where the estimate is normalized by dividing by the sum of the "weights" created from the similarity operator:

$$x_{est} = \frac{D \cdot (D^T \otimes D)^{-1} \cdot (D^T \otimes x_{new})}{\sum ((D^T \otimes D)^{-1} \cdot (D^T \otimes x_{new}))} \quad (8)$$

Figure 4:
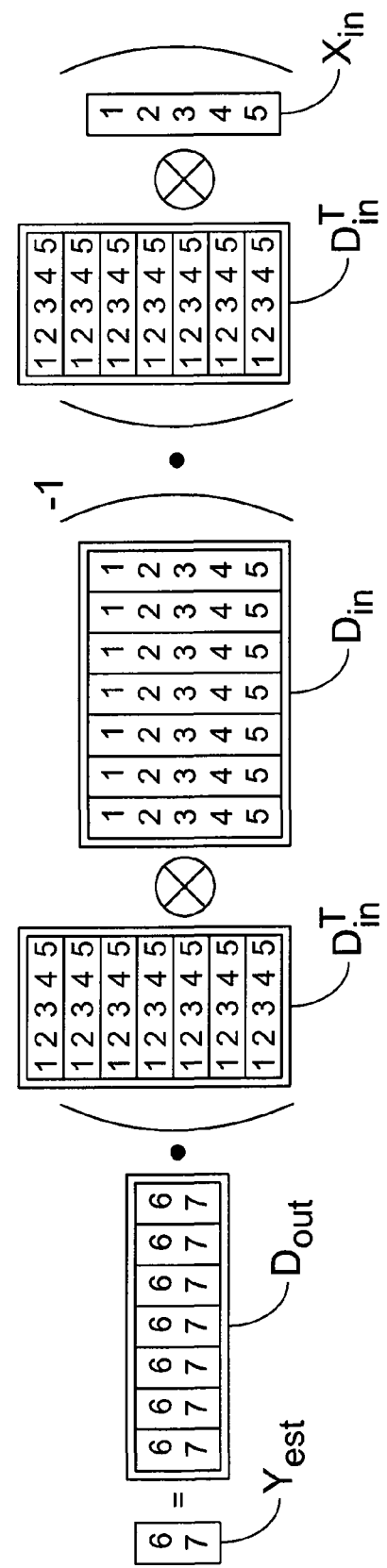
FIG. 4 is a schematic diagram of one form of the inferential similarity based modeling equation.

In the inferential form of similarity-based modeling, the inferred parameters vector $y_{est}$ is estimated from the learned observations and the input according to:

$$y_{est} = D_{out} \cdot (D_{in}^T \otimes D_{in})^{-1} \cdot (D_{in}^T \otimes x_{in}) \quad (9)$$

where $D_{in}$ has the same number of rows as actual parameter values in $x_{in}$, and $D_{out}$ has the same number of rows as the total number of parameters including the inferred parameters. Equation (9) is shown schematically on FIG. 4 to show the location of the vectors, the input values (1 to 5), and the resulting inferred values (6-7).

In one form, the matrix of learned exemplars $D_a$ can be understood as an aggregate matrix containing both the rows that map to the parameter values in the input vector $x_{in}$ and rows that map to the inferred parameters:

$$D_a = \begin{bmatrix} D_{in} \\ D_{out} \end{bmatrix} \quad (10)$$

Normalizing as before using the sum of the weights:

$$y_{est} = \frac{D_{out} \cdot (D_{in}^T \otimes D_{in})^{-1} \cdot (D_{in}^T \otimes x_{in})}{\sum ((D_{in}^T \otimes D_{in})^{-1} \cdot (D_{in}^T \otimes x_{in}))} \quad (11)$$

It should be noted that by replacing $D_{out}$ with the full matrix of leaned exemplars $D_a$, similarity-based modeling can simultaneously calculate estimates for the input parameters (autoassociative form) and the inferred parameters (inferential form):

$$\begin{bmatrix} x_{est} \\ y_{est} \end{bmatrix} = \frac{D_a \cdot (D_{in}^T \otimes D_{in})^{-1} \cdot (D_{in}^T \otimes x_{in})}{\sum ((D_{in}^T \otimes D_{in})^{-1} \cdot (D_{in}^T \otimes x_{in}))} \quad (12)$$

Figure 5:
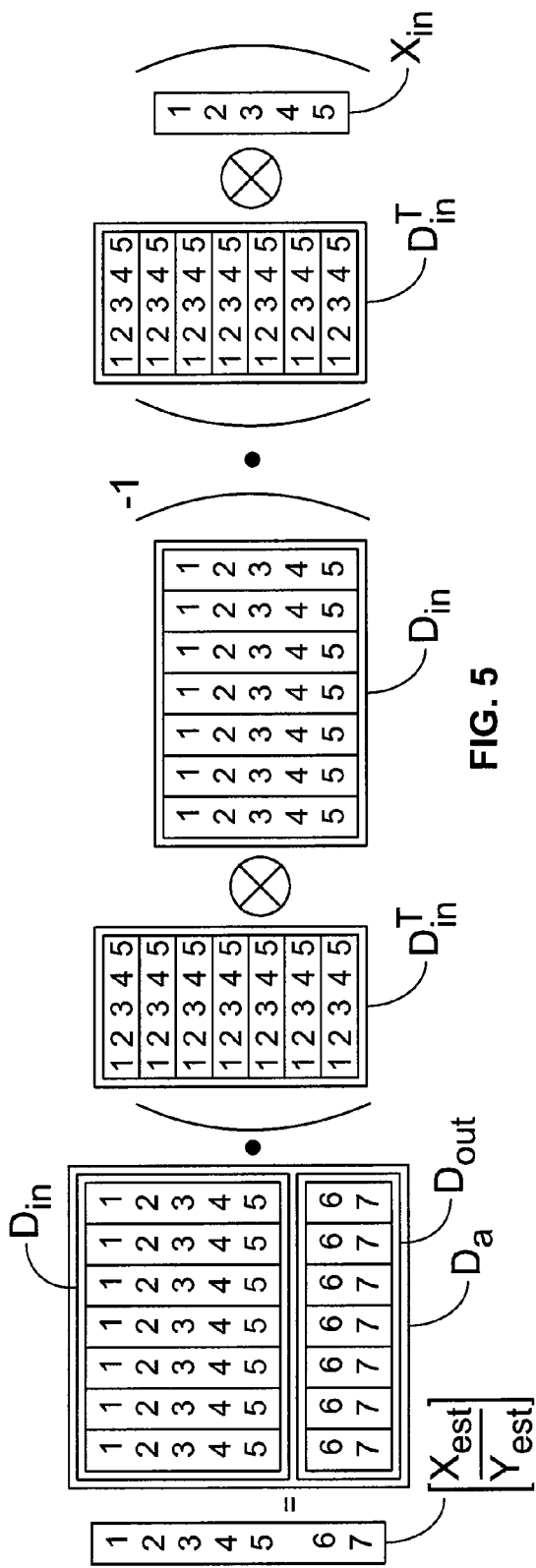
FIG. 5 is a schematic diagram of another form of the inferential similarity based modeling equation.

Referring to FIG. 5, Equation (12) uses the matrix $D_a$ with reference values for both the input and inferred values. This results in an estimate vector with both representative input values and inferred values.

Yet another kernel-based modeling technique similar to the above is the technique of radial basis functions. Based on neurological structures, radial basis functions make use of receptive fields, in a special form of a neural network, where each basis function forms a receptive field in the n-dimensional space of the input vectors, and is represented by a hidden layer node in a neural network. The receptive field has the form of the kernels described above, where the "center" of the receptive field is the exemplar that particular hidden unit represents. There are as many hidden unit receptive fields as there are exemplars. The multivariate input observation enters the input layer, which is fully connected with the hidden layer. Thus, each hidden unit receives the full multivariate input observation, and produces a result that is maximum when the input matches the "center" of the receptive field, and diminishes as they become increasingly different (akin to SBM described above). The output of the hidden layer of receptive field nodes is combined according to weights $c_i$ (as above in equation 1).

As mentioned above, the kernel can be chosen from a variety of possible kernels, and in one form is selected such that it returns a value (or similarity score) for the comparison of two identical vectors that has a maximum absolute value of all values returned by that kernel. While several examples are provided herein, they are not meant to limit the scope of the invention. Following are examples of kernels/similarity operators that may be used according to the invention for the comparison of any two vectors $x_a$ and $x_b$.

$$K_h(x_a, x_b) = e^{-\frac{\|x_a - x_b\|^2}{h}} \quad (13)$$

$$K_h(x_a, x_b) = \left(1 + \frac{\|x_a - x_b\|^\lambda}{h}\right)^{-1} \quad (14)$$

$$K_h(x_a, x_b) = 1 - \frac{\|x_a - x_b\|^\lambda}{h} \quad (15)$$

In equations 13-15, the vector difference, or "norm", of the two vectors is used; generally this is the 2-norm, but could also be the 1-norm or p-norm. The parameter h is generally a constant that is often called the "bandwidth" of the kernel, and affects the size of the "field" over which each exemplar returns a significant result. The power $\lambda$ may also be used, but can be set equal to one. It is possible to employ a different h and $\lambda$ for each exemplar $x_i$. By one approach, when using kernels employing the vector difference or norm, the measured data should first be normalized to a range of 0 to 1 (or other selected range), for example, by adding to or subtracting from all parameter values the value of the minimum reading of that parameter's data set, and then dividing all results by the range for that parameter. Alternatively, the data can be normalized by converting it to zero-centered mean data with a standard deviation set to one (or some other constant). Furthermore, a kernel/similarity operator according to the invention can also be defined in terms of the elements of the observations, that is, a similarity is determined in each dimension of the vectors, and those individual elemental similarities are combined in some fashion to provide an overall vector similarity. Typically, this may be as simple as averaging the elemental similarities for the kernel comparison of any two vectors x and y:

$$K(x, y) = \frac{1}{L}\sum_{m=1}^{L} K(x_m, y_m) \quad (16)$$

Then, elemental similarity operators that may be used according to the invention include, without limitation:

$$K_h(x_m, y_m) = e^{-\frac{|x_m - y_m|^2}{h}} \quad (17)$$

$$K_h(x_m, y_m) = \left(1 + \frac{|x_m - y_m|^\lambda}{h}\right)^{-1} \quad (18)$$

$$K_h(x_m, y_m) = 1 - \frac{|x_m - y_m|^\lambda}{h} \quad (19)$$

The bandwidth h may be selected in the case of elemental kernels such as those shown above, to be some kind of measure of the expected range of the mth parameter of the observation vectors. This could be determined, for example, by finding the difference between the maximum value and minimum value of a parameter across all exemplars. Alternatively, it can be set using domain knowledge irrespective of the data present in the exemplars or reference vectors. Furthermore, it should be noted with respect to both the vector and elemental kernels that use a difference function, if the difference divided by the bandwidth is greater than 1, it can be set equal to one, resulting in a kernel value of zero for equations 14, 15, 18 and 19, for example. Also, it can readily be seen that the kernel or similarity operator can be modified by the addition or multiplication of different constants, in place of one, h, $\lambda$, and so on. Trigonometric functions may also be used, for example:

$$K_h(x_m, y_m) = \left(1 + \sin\left(\frac{\pi}{2h}|x_m - y_m|\right)\right)^{-1} \quad (20)$$

In one form, the similarity operator or kernel generally provides a similarity score for the comparison of two identically-dimensioned vectors, which similarity score:
1. Lies in a scalar range, the range being bounded at each end;
2. Has a value of one (or other selected value) at one of the bounded ends, if the two vectors are identical;
3. Changes monotonically over the scalar range; and
4. Has an absolute value that increases as the two vectors approach being identical.

All of the above methods for modeling use the aforementioned kernel-based approach and use a reference library of the exemplars. The exemplars (also called reference observations or reference vectors) represent "normal" behavior of the modeled system. Optionally, the available reference data can be down-selected to provide a characteristic subset to serve as the library of exemplars, in which case a number of techniques for "training" the kernel-based model can be employed. In this case, the down-selected library itself may form the matrix D used in the equations above. According to one training method, at least those observations are included in the library that have a highest or lowest value for a given parameter across all available reference observations. This can be supplemented with a random selection of additional observations, or a selection chosen to faithfully represent the scatter or clustering of the data. Alternatively, the reference data may be clustered, and representative "centroids" of the clusters formed as new, artificially generated exemplars, which then form the library. A wide variety of techniques are known in the art for selecting the observations to comprise the library of exemplars. Thus, at least in general terms for this case, the matrix D remains the same in equation (7) for all of the input vectors $x_{in}$ unless the library is changed (i.e. such as when the library is updated).

In an alternative arrangement for both the inferential and autoassociative forms of the empirical kernel-based model, matrix D can be reconfigured for each input vector $x_{in}$ so that the model can be generated "on-the-fly" based on qualities of the input observation, and drawing from a large set of learned observations, i.e., a reference set. One example of this is described in U.S. Pat. No. 7,403,869. This process is called localization. Accordingly, the inferential and autoassociative forms of kernel-based modeling can be carried out using a set of learned observations $x_i$ (matrix D) that are selected from a larger set of reference observations, based on the input observation. Kernel-based models are exceptionally well suited for this kind of localization because they are trained in one pass and can be updated rapidly. Advantageously, by drawing on a large set of candidate exemplars, but selecting a subset with each new input observation for purposes of generating the estimate, the speed of the modeling calculation can be reduced and the robustness of the model improved, while still well characterizing the dynamics of the system being modeled.

For the monitoring system 10, the localization module 28 can use a variety of criteria to constitute the localized matrix membership for collection D(t), including the application of the similarity operator itself. In general, however, the input observation 32, comprising the set of parameters or derived features that are to be estimated by the model as part of the monitoring process, are provided to the localization module 28, which accesses a large store of exemplar observations in the form of reference library 18, in order to select a subset of those exemplar observations to build the model. Localization module 28 selects exemplars from library 18 that are relevant to the input observation 32, which can be a much smaller set than the size of the library. By way of example, the reference library 18 might comprise 100,000 exemplar observations that characterize the normal dynamics of the system represented by the parameters being modeled, but the localization module 28 might select only a few dozen observations to build a localized model in response to receiving the input observation 32. The selected exemplar observations are then provided to the now localized model 14. In the vector-based system, these observations then comprise the set of learned exemplars $x_i$ for purposes of the kernel-based estimator (also shown as D in connection with SBM above). The estimate observation $x_{est}$ is then generated accordingly as described above. For the monitoring system 10, the selected learned exemplars each may represent a vector at time point $t_p$, such that a sequential pattern matrix is built for each vector at $t_p$ to form the collection D(t) described below. As the next input observation 32 is presented to the monitoring system 10, the process is repeated, with selection of a new and possibly different subset of exemplars from library 18, based on the new input observation.

According to one approach, the input observation 32 can be compared to the reference library 18 of learned observations, on the basis of a clustering technique. Accordingly, the exemplar observations in library 18 are clustered using any of a number of techniques known in the art for clustering vectors, and the localization module 28 identifies which cluster the input observation 32 is closest to, and selects the member exemplars of that cluster to be the localized observations provided to the localized model 14. Suitable clustering methods include k-means and fuzzy c-means clustering, or a self-organizing map neural network.

According to another approach, a kernel can be used to compare the input observation 32 to each exemplar in the library 18 to yield a similarity value that provides a ranking of the reference observations vis-à-vis the input observation. Then, a certain top fraction of them can be included in the localized collection D(t). As a further refinement of this localization aspect, observations in the ranked list of all reference observations are included in localized collection D(t) to the extent one of their component elements provides a value that "brackets" the corresponding value in the input vector. For example, a search down the ranked list is performed until values in the input vector are bracketed on both the low and high side by a value in one of the reference observations. These "bracketing" observations are then included in localized collection D(t) even if other observations in library 18 have higher similarity to the input. The search continues until all input values in the input vector are bracketed, until a user-selectable maximum limit of vectors for building sequential pattern matrices to include in collection D(t) is reached, or until there are no further reference observations that have sufficiently high similarity to the input to surpass a similarity threshold for inclusion.

Other modifications in determining the membership of localized collection D(t) are contemplated. By way of example, in both the clustering selection method and the similarity selection method described above, the set of elements, i.e., parameters used to comprise the vectors that are clustered or compared with the kernel for similarity, may not be identical to those used to generate the model and the estimate, but may instead be a subset, or be a partially overlapping set of parameters. As mentioned above, an additional step for the system 10 and model 14 is then performed to generate the collection D(t). Specifically, once the vectors (referred to as primary vectors $t_p$) are selected for inclusion in collection D(t), other temporally related vectors (whether looking forward or looking back in time) are selected for each primary vector to form a learned sequential pattern matrix for each primary vector and included in the collection D(t). The process for choosing the temporally related vectors is explained below. It will be understood that the localization by the module 28 can be applied to any of the three-dimensional collections of learned sequential pattern matrices described in detail below.

Turning now to the incorporation of the time domain information into the model 14, by one approach for the monitoring system 10 described herein, the above kernel function, which operates to compare the similarity of two vectors, is replaced by an extended kernel function K that operates on two identically-dimensioned arrays:

$$\ddot{K}(\vec{X}_{new}, \vec{X}_i) \quad (20)$$

where $X_{new}$ is an input pattern array and $X_i$ is a learned pattern array. A pattern array or pattern matrix is composed of a sequence of temporally-related vectors, where each of its constituent vectors contains financial parameter data from a distinct moment in time. One of the vectors in a pattern array is designated the primary vector, and the time at which its data is derived is designated the current primary time point $t_p$. The other vectors are associated with time points that relate to the primary time point in a systematic manner.

In one form, the primary time point is the most recent of the time points that compose a sequence of the time-ordered points (or time-ordered vectors that represent those time points) in the pattern array. By one approach, the other time points are equally-spaced and precede the primary time point by integer multiples of a time step Δt providing uniform time intervals between the time points. For a given number of samples $n_{lb}$, the time points form an ordered sequence: ($t_p$−$n_{lb}$Δt, $t_p$−($n_{lb}$−1)Δt, . . . , $t_p$−2Δt, $t_p$−Δt, $t_p$). The sequence of time points defines a look-back pattern array, $$\ddot{X}(t_p) = [x(t_p - n_{lb}\Delta t), x(t_p - (n_{lb}-1)\Delta t), \ldots x(t_p - 2\Delta t), x(t_p - \Delta t), x(t_p)] \quad (21)$$

Figure 6:
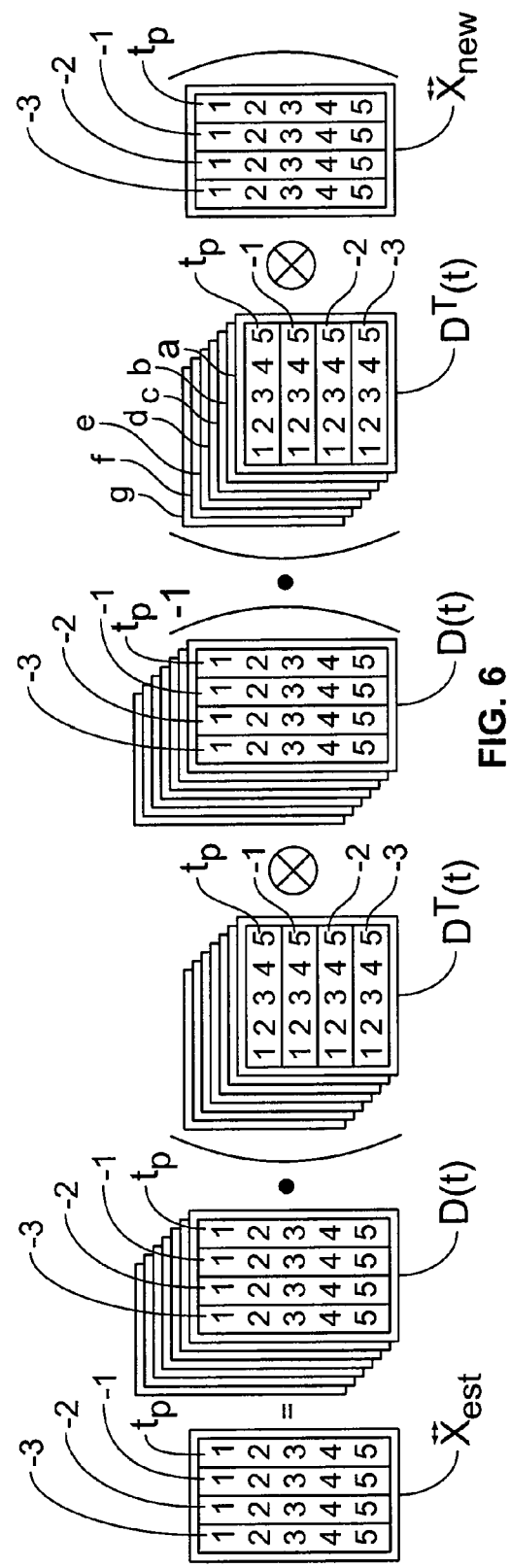
FIG. 6 is a schematic diagram of the autoassociative sequential similarity based modeling equation.

As shown in FIG. 6, the primary vector $t_p$ is positioned as the right-most column of each pattern array, and the other ($n_{lb}$) data vectors are column vectors that are located to the left of the primary vector $t_p$. The rows of the pattern arrays correspond to short segments of the time-varying signals from the modeled parameters.

By using look-back pattern arrays, the extended kernel function in equation (20) can be applied to real-time system monitoring. The primary vector $t_p$ (which means the vector at time point $t_p$) in the input pattern array $X_{new}$ contains system data from the current point in time, and the remainder of the array consists of data vectors from recent time points in the past. Thus, not only does the input pattern array contain the current, albeit static, vector used by traditional kernel methods, but it also contains a sequence of vectors that express the developing, dynamic behavior of the monitored system. As system time progresses, new input pattern arrays are formed which contain much of the same data as preceding arrays except that new primary vectors appear in the right-most position of the arrays, and the oldest vectors are dropped from the left-most position. Thus, a single input vector representing a single instant in time will be used in multiple input pattern arrays $X_{new}$, and assuming the vectors are used in sequence, the vectors will be used the same number of times as there are vectors in the array. In this manner, the input pattern array describes a moving window of patterns through time. Here, moving window means a set or group of a fixed number of vectors in chronological order that changes which vectors are included in the set as the window moves along the timeline or along a sequence of time-ordered parameter value vectors.

The pattern array defined in equation (21) above contains $n_{lb}$ data vectors that span a window in time equal to $n_{lb}*\Delta t$. The data vectors are equally-spaced in time for this example. Another way to say this is that each input pattern array or matrix is defined only by uniform time intervals between time points represented by the input vectors within the input pattern array $X_{new}$.

Alternatively, a kernel can be used to compare pattern arrays that span differing lengths of time. If a pattern array contains data from time points that are spaced by one time step $\Delta t_1$ (say one second apart for example), and if the time points of another pattern array differ by a second time step $\Delta t_2$ (say ten seconds apart for example), then the pattern arrays will span two differing time windows: $n_{lb}*\Delta t_1$ and $n_{lb}*\Delta t_2$ so that there are two pattern arrays that represent different durations. In one form, as long as the pattern arrays contain the same number of vectors even though one pattern array may have different time intervals between the vectors (or time points) than in another pattern array, a kernel function that matches vectors from the same positions in the two pattern arrays (such as right-most with right-most, second from right with second from right, and onto left-most with left-most) will be capable of operating across varying time scales. Thus, in one example, the matrices may extend across differently spaced time points so that the time interval spacing could correspond to the harmonics (1/f) of the peaks in a spectral time signal. It also will be understood that this difference in time period or duration covered by the pattern arrays may be used between the learned pattern arrays and input pattern arrays, from input pattern array to input pattern array, from learned pattern array to learned pattern array, or any combination of these as long as each vector in the input pattern array has a corresponding learned exemplar in the learned pattern arrays (or in other words, both learned and input matrices have the same number of vectors).

According to another example, a kernel can be used to compare pattern arrays whose pattern vectors are not equally-spaced in time. Instead of spacing pattern vectors by a constant time interval or step, the time step can vary by position within the pattern array. By using small time steps for most recent vectors (positioned near the right side of the array) and larger time steps for the older vectors (positioned near the left side of the array), the kernel function will focus attention on the most recent changes while still retaining some effect from changes in the more distant past.

Referring again to FIG. 1, an additional filtering step may be performed on the pattern arrays by a filter module 106 prior to analysis by the kernel function (equation (21)). When the filtering is used, it is performed on both the reference vectors and the input vectors to avoid any substantial, unintentional mismatch between the two resulting signal values to be used for generating estimates. In the filtering step, each of the time-varying data segments (rows of a pattern array) are processed by a filtering algorithm to either smooth the data in the segment or to calculate statistical features from the data. Smoothing algorithms, such as moving window averaging, cubic spline filtering, or Savitsky-Golay filtering, capture important trends in the original signal, but reduce the noise in the signal. Since smoothing algorithms produce smoothed values for each of the elements in the input signal, they produce a pattern array that has the same dimensions as the original pattern array of parameter data. Alternately, the filtering step can consist of the application of one or more feature extraction algorithms to calculate statistical features of the data in each signal. These features may include the mean, variance, or time derivatives of the signal data. As long as the same number of feature extraction algorithms is applied to the data in the pattern arrays, the number of data vectors in the original pattern array can vary.

As described above, there are numerous methods in which pattern arrays are used to represent temporal information from the system being modeled. These methods include, but are not limited to, sequences of data vectors from equally-spaced time points, sequences of data vectors that span differing time periods such that the pattern arrays have varying durations, and sequences whose data vectors are not equally-spaced in time. The input pattern array may have different intervals than the reference pattern arrays, or they may be the same. In addition, the pattern sequences can be filtered by smoothing or feature extraction algorithms. The only limitation on the form of the pattern arrays or the arrays produced by filtering algorithms are that the two arrays processed by the extended kernel function (equation 20) be identically-dimensioned (i.e., having the same number of rows and columns).

Similar to the vector-based kernel function described above, the extended kernel function returns a scalar value or similarity measure, although here, the scalar value represents the similarity between two arrays rather than two vectors. The extended kernel function produces a similarity score that displays the same properties as the vector-based kernel function enumerated above. Namely, the similarity score is a scalar whose range is bounded; has a value of one (or other selected value) for one of the bounds when the two arrays are identical; varies monotonically over the range; and whose absolute value increases as the two arrays approach being identical. In addition, the extended kernel function operates on the matching temporal components of the two arrays. This means, for the example of two look-back pattern arrays, that the extended kernel function finds the similarity between the two primary vectors $t_p$ from the reference and input pattern arrays respectively, then on the two data vectors to the left of the primary vectors −1, and so forth across the preceding vectors in the arrays.

One example of an extended kernel function is based on the similarity operator described in U.S. Pat. No. 6,952,662. Letting $X_{new}$ and $X_i$ be two identically-dimensioned pattern arrays, containing data from $n_{sens}$ parameters and spanning $n_{lb}$ sequential time points, the extended kernel function is written as follows:

$$S(\vec{X}_{new}, \vec{X}_i) = \frac{1}{1 + \frac{1}{\rho}\left(\frac{1}{n_{sens}}\sum_{j=1}^{n_{sens}} \theta_j(t)\right)^{\lambda}} \quad (22)$$

where ρ and λ are constants. The time-dependent function θ(t) in equation 22 operates on the temporal elements of the pattern arrays, matching data from the same time point vectors in the two arrays. One means of accomplishing this temporal data matching is to use a weighted average of the temporal data for a given parameter j:

$$\theta_j(t) = \left[\sum_{k=1}^{n_{lb}} (W_k s_{j,k})\right] \bigg/ \sum_{k=1}^{n_{lb}} W_k \quad (23)$$

The similarity ($s_{j,k}$) between data elements for a given parameter j is defined as the absolute difference of the data elements normalized by the range of training data for a parameter $range_j$. Thus, the time-dependent similarity function θ(t) for a given parameter's data is:

$$\theta_j(t) = \left[\sum_{k=1}^{n_{lb}} \left(\frac{W_k |\vec{X}_{new;j,k} - \vec{X}_{i;j,k}|}{range_j}\right)\right] \bigg/ \sum_{k=1}^{n_{lb}} W_k \quad (24)$$

Combining equations 22 and 24, produces an extended kernel function for two pattern arrays:

$$S(\vec{X}_{new}, \vec{X}_i) = \frac{1}{1 + \frac{1}{\rho}\left[\frac{1}{n_{sens}}\sum_{j=1}^{n_{sens}}\left(\frac{\sum_{k=1}^{n_{lb}}\left(\frac{W_k |\vec{X}_{new;j,k} - \vec{X}_{i;j,k}|}{range_j}\right)}{\sum_{k=1}^{n_{lb}} W_k}\right)^\lambda\right]} \quad (25)$$

Another example of an extended kernel function is based on the similarity operator described in U.S. Pat. No. 7,373,283. Again letting $X_{new}$ and $X_i$ be two identically-dimensioned pattern arrays, containing data from $n_{sens}$ parameters and spanning $n_{lb}$ sequential time points, this second extended kernel function is written as follows:

$$S(\vec{X}_{new}, \vec{X}_i) = \frac{1}{n_{sens}} \sum_{j=1}^{n_{sens}} \left[\frac{1}{1 + \frac{1}{\rho}(\theta_j(t))^\lambda}\right] \quad (26)$$

This extended kernel function utilizes the same time-dependent function θ(t) as defined by equations 23 and 24 to compare the temporal data of a given parameter in the two pattern matrices:

$$S(\vec{X}_{new}, \vec{X}_i) = \frac{1}{n_{sens}} \sum_{j=1}^{n_{sens}} \left[\frac{1}{1 + \frac{1}{\rho}\left(\frac{\sum_{k=1}^{n_{lb}}\left(\frac{W_k |\vec{X}_{new;j,k} - \vec{X}_{i;j,k}|}{range_j}\right)}{\sum_{k=1}^{n_{lb}} W_k}\right)^\lambda}\right] \quad (27)$$

While referring to FIG. 6, the two extended kernel functions (equations 25 and 27) differ only in how they aggregate information from the modeled parameters, with the first equation representing the elemental form of a kernel function, and the second equation representing the vector difference form (such as 1-norm) of a kernel function. Both equations utilize weighted averaging to account for differences between the segments of time-varying signals in the two arrays $X_{new}$ and $X_i$. Specifically, for both example equations 25 and 27, and for each sequential learned pattern matrix a to g, the absolute difference is calculated for each corresponding pair of learned and input values. The values correspond when they represent (1) the same parameter and (2) either the same time point within the pattern array (such as both values being from the primary time $t_p$) or the same position relative to the other vectors in the array (such as when both values are on vectors that are second from the right within the pattern array). The absolute differences from the pairs of learned and input values are combined via weighted averaging to obtain a resulting single average value for the particular parameter. This is repeated for each parameter (1 to 5) represented by the pattern matrices a to g and pattern arrays $X_{new}$ so that there is one resulting average scalar for each parameter in the weighted averaging step.

Then, in the first extended kernel function (equation 25), the results from the weighted averaging step are in turn averaged across all parameters to produce a scalar value for the array-to-array comparison. Finally, this scalar value is transformed into a value that adheres to the properties of a similarity score as described above so that it falls within a range of zero to one for example, with one meaning identical. This process is then repeated for each learned sequential pattern matrix a to g in the three-dimensional collection D(t). In the second extended kernel function (equation 27), the results from the weighted averaging step are converted into similarity scores right away, one for each parameter. Then this vector of similarity scores is averaged so that a single similarity score is returned by the function for each learned sequential pattern matrix a to g in the three-dimensional collection D(t).

When used within context of similarity-based modeling, the extended kernel functions described above can also be termed extended similarity operators without loss of generality. The notation used in the above equations ($S(X_{new}, X_i)$) can also be written using the traditional similarity operator symbol ($X_{new} \otimes X_i$).

Extended versions of other vector-based kernel functions defined above (for example, equations 13 through 20) can be constructed by using weighted averaging to match temporal data from the same time points in two sequential pattern arrays. For instance, letting $X_{new}$ and $X_i$ be two identically-dimensioned pattern arrays, containing data from $n_{sens}$ parameters and spanning $n_{lb}$ sequential time points, an extended version of the kernel function defined in equation 16, using the elemental similarity operator of equation 17, is:

$$K_h(\vec{X}_{new}, \vec{X}_i) = \frac{1}{n_{sens}} \sum_{j=1}^{n_{sens}} \left[\exp\left(-\frac{1}{h}\left[\frac{\sum_{k=1}^{n_{lb}} W_k |\vec{X}_{new;j,k} - \vec{X}_{i;j,k}|^2}{\sum_{k=1}^{n_{lb}} W_k}\right]\right)\right] \quad (28)$$

Weighted averaging (equation 22) is used to account for differences between segments of the time-varying signals in pattern arrays since the weights can be selected such that more recent data are more heavily weighted than outdated data. Thus, data from the primary time point $t_p$ are typically given the highest weight, with data from preceding time points (equation 21) given ever-decreasing weights. Numerous schemes can be used to define the weights, such as having them decline linearly or exponentially with time relative to the primary time point.

It will be understood that various other time-dependent functions θ(t) can be used to match data from sequential time points in two segments of time-varying signals. Such methods include, but are not limited to, other weighted norms (2-norm and p-norm) and maximum, minimum, or median difference. All that is required of the function is that it returns a scalar value that is minimized (a value of 0) if the two sequences are identical and increases in value as the sequences become more different.

In order to combine the concept of sequential pattern arrays with an extended similarity operator (for example, equation 25 or 27) in the autoassociative form of SBM (equation 7), the concept of the vector-based learned vector matrix D is extended. In the standard form of SBM described above, the learned vector matrix consists of a set of learned exemplars (vectors) selected from various points in time during periods of normal system behavior. Letting the time points from which these vectors are selected represent primary time points, each learned vector can be expanded into a learned sequential pattern matrix by collecting data from a sequence of time points that precede each primary time point. In this manner, the learned vector matrix D is expanded into a collection of learned sequential pattern matrices D(t). This collection of learned pattern matrices forms a three-dimensional matrix, wherein the dimensions represent the modeled parameters in a first dimension, the learned exemplars (vectors) from various primary time points in a second dimension, and time relative to the primary time points in a third dimension.

The training methods described above that are used for constructing the learned vector matrix used in vector-based forms of SBM can be utilized to create the three-dimensional collection of learned sequential pattern matrices D(t) required by the sequential pattern forms of SBM. This is accomplished by augmenting each reference vector selected by a training algorithm with reference vectors from preceding time points to construct a sequential pattern matrix. The collection of learned pattern matrices, one for each reference vector selected by a training algorithm, is drawn from reference library 18 of exemplars which represents "normal" behavior of the modeled system. If the time-inferential form of sequential SBM (described below) is used, then additional vectors from succeeding time points are added to each sequential pattern matrix.

The training methods that are used for the vector-based forms of SBM select exemplars (vectors) from various points in time during periods of normal system behavior, without regard to the time domain information inherent in the reference data. In the sequential pattern array forms of SBM, that time domain information is supplied by augmenting each of the selected exemplars with data vectors from a sequence of time points that immediately precede and (possibly) succeed the primary time points. In an alternative process for building and localizing the collection D(t) of sequential learned pattern matrices while factoring in the time domain information, each input pattern array may be compared to every sequence of reference vectors that is equal in number (namely, $n_{lb}+1$) to that in the input pattern array. The comparison is accomplished by using an extended form of the similarity operator (for example, equation 25 or 27) to identify those sequences of reference vectors that are most similar to the input pattern array. Each of the identified sequences of reference vectors forms one of the sequential learned pattern matrices in the collection D(t). Whatever the selection process, it is possible for a training method to select exemplars from primary time points that are quite near to one another. When two exemplars are selected from nearby primary time points, the corresponding sequential pattern matrices may contain data vectors in common.

Referring to FIG. 6, equation 7 is shown with an input pattern array $X_{new}$ and a three-dimensional collection of learned sequential pattern matrices D(t). The input pattern array $X_{new}$ may also be referred to as the current or actual pattern array or matrix since it includes the vector $t_p$ representing a current instant in time, and in contrast to the learned pattern matrices in D(t). In the illustrated example, the input pattern array $X_{new}$ includes four vectors where vector $t_p$ is the last (right-most) vector in the array. The other vectors are numbered as −3 to −1 referring to the number of time intervals before $t_p$ for simplicity. Thus, it will be understood that vector −3 on FIG. 6 represents the same thing as $(t_p-n_{lb}\Delta t)$ where $n_{lb}=3$. As shown in FIG. 6, the three dimensions of the collection of learned sequential pattern matrices (modeled parameters, primary time points, and pattern sequences) are depicted as follows: the numbers 1 through 5 represent data from five modeled parameters, the four columns (or vectors) of numbers represent four sequential time points, and the seven layered rectangles each represent a sequential pattern matrix a to g each with a primary time point $t_p$ selected from various periods of normal system behavior. The three-dimensional collection of learned sequential pattern matrices D(t) contains the seven sequential pattern matrices a to g. Thus, each sequential pattern matrix a to g comprises data from five parameters and four sequential points in time, and has the same dimensions as the input pattern matrix $X_{new}$. For comparison, another way to visualize the difference between the prior vector-based equation with a two-dimensional matrix D (FIG. 3) and the three-dimensional collection of learned sequential pattern matrices D(t) (FIG. 6) is that the prior two-dimensional array would merely have been formed by a single matrix cutting across the seven sequential pattern arrays a to g to include only the $t_p$ vectors from the three-dimensional collection D(t).

In the right-most bracket in FIG. 6, the extended similarity operator (⊗) calculates the similarity between the input pattern array $X_{new}$ and the seven learned sequential pattern matrices a to g as explained above. In the example of FIG. 6, and using the weighted averaging step from equations 25 or 27, the model compares the time-varying signal for parameter 1 in sequential pattern matrix a to the time-varying signal for parameter 1 in the input pattern array $X_{new}$ to obtain a single average value for parameter 1. This is repeated for parameters 2-5 until one average value is provided for each parameter. Then, these scalar values (or similarity scores for equation 27) are averaged to determine a single similarity measure for sequential pattern matrix a. This is then repeated for each sequential pattern matrix b to g, returning a similarity vector containing seven similarity scores, one similarity score for each learned sequential pattern matrix a to g.

The operation in the middle bracket produces a seven-by-seven square similarity matrix of similarity values, one for each combination of a pair of learned sequential pattern matrices a to g in collection D(t). Multiplication of the inverse of the resulting similarity matrix with the similarity vector produces a weight vector containing seven elements. In a final step, the weight vector is multiplied by the collection D(t) to create an estimate matrix $X_{est}$. In one form, the estimate matrix $X_{est}$ is the same size as the input pattern array $X_{new}$ so that it has an estimate vector that corresponds to each of the time periods represented by the input vectors in the input pattern arrays. In the present example of FIG. 6, the estimate matrix $X_{est}$ has an estimate vector for the current moment in time $t_p$ and for each of the three preceding time points −1 to −3 as if formed in a look-back window. The use of the estimate matrix $X_{est}$ is described in further detail below. It also should be noted that the preceding vectors grouped together with or without the current or primary vector may be called a look-back window anywhere herein, and the succeeding vectors grouped together with or without the current or primary vector may be called a look-ahead window explained below and anywhere herein.

Figure 7:
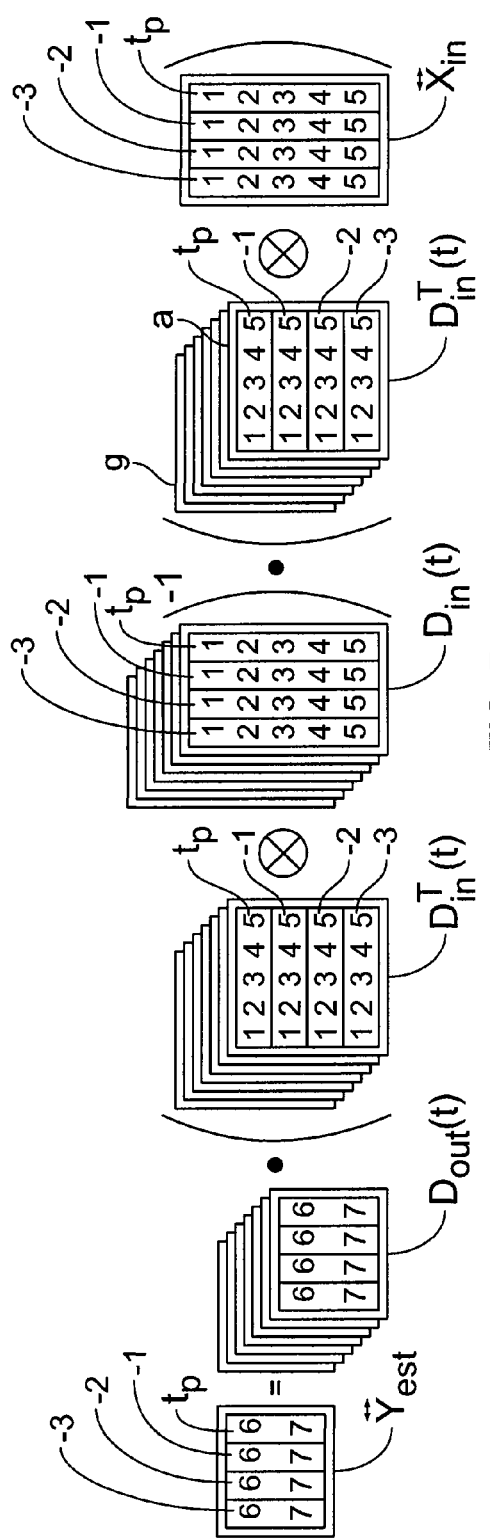
FIG. 7 is a schematic diagram of one form of the inferential sequential similarity based modeling equation that extrapolates in the modeled parameter dimension.

Extensions to the inferential form of SBM (equation 9) that utilize sequential pattern matrices with an extended similarity operator are readily apparent. Analogous to the vector-based form of inferential modeling, the three-dimensional collection of learned sequential pattern matrices $D_a(t)$ can be understood as an aggregate matrix containing learned sequential pattern matrices a to g that map to the parameter values in the input pattern array $X_{in}$ and sequential pattern matrices a to g that map to the inferred parameters $D_{out}(t)$. Referring to FIG. 7, equation 9 is shown with an input pattern array $X_{in}$ and a three-dimensional collection of learned sequential pattern matrices $D_{in}(t)$ with seven learned sequential pattern matrices a to g for the five input parameters 1 to 5. It is understood that the aggregate matrix $D_a(t)$ is a three-dimensional extension of the two-dimensional aggregate matrix defined in equation 10. Comparing the illustration in FIG. 7 to that in FIG. 6, the matrices within the brackets of both figures are identical except for how they are denoted. Therefore, the calculation of the weight vector for an inferential model proceeds in the same manner as that described above for an autoassociative model. Then, as in FIG. 4, the weight vector is multiplied by the learned sequential pattern array for the inferred parameters in FIG. 7 except that here matrix $D_{out}(t)$ is now a three-dimensional collection of learned sequential pattern matrices, and this step forms an estimate matrix $Y_{est}$ representing only the inferred parameters. As described above for the vector-based form of inferential modeling, the weight vector can also be multiplied by the full three-dimensional collection of learned sequential pattern matrices $D_a(t)$ that includes both $D_{in}(t)$ and $D_{out}(t)$ to generate estimate matrices for both input and inferred parameters (depicted in FIG. 8).

Inferential modeling enables calculation of estimates for parameters whose data are not included in the input data stream because reference data for these parameters are included in the three-dimensional collection of learned sequential pattern matrices $D_a(t)$ or $D_{out}(t)$. Conceptually, an inferential model extrapolates along the dimension of the modeled parameters. It is also possible to create an inferential model that extrapolates in the time dimension. This can be understood by revisiting the concept of the primary time point and the look-back window of equation 21. The time points in the look-back window precede the primary time point, meaning that they lie in the past relative to the primary time. One can also define a look-ahead window, constructed of time points that succeed the primary time. The time points in a look-ahead window are in the future relative to the primary time. Consider an ordered sequence of time points composed of a given number ($n_{lb}$) of time points that precede the primary time point and a given number ($n_{la}$) of time points that succeed the primary time point: $(t_p-n_{lb}\Delta t, t_p-(n_{lb}-1)\Delta t, \ldots, t_p-2\Delta t, t_p-\Delta t, t_p, t_p+\Delta t, t_p+2\Delta t, \ldots, t_p+(n_{la}-1)\Delta t, t_p+n_{la}\Delta t)$. The sequence of time points defines a pattern array that contains both look-back and look-ahead data, $$\vec{X}(t_p) = \begin{bmatrix} x(t_p - n_{lb}\Delta t), x(t_p - (n_{lb}-1)\Delta t), \cdots \\ x(t_p - 2\Delta t), x(t_p - \Delta t), x(t_p), \\ x(t_p + \Delta t), x(t_p + 2\Delta t), \cdots x(t_p + (n_{la}-1)\Delta t), \\ x(t_p + n_{la}\Delta t) \end{bmatrix} \quad (29)$$

Referring to FIG. 9, an extension to the inferential form of SBM (equation 9) that supports extrapolation into the time dimension is produced if the three-dimensional collection of learned sequential pattern matrices $D_a(t)$ is created with sequential pattern matrices a to g that contain both look-back and look-ahead data. Since the input pattern array $X_{in}$ contains data only from the current time point and preceding time points (data from future time points do not exist yet), the collection of learned sequential pattern matrices $D_a(t)$ is an aggregate matrix composed of two sub-matrices separated along the time dimension. The first of these sub-matrices $D_{lb}(t)$ contains the data from the various primary time points and from the look-back time points. The second sub-matrix $D_{la}(t)$ contains the data from the look-ahead time points. Equation 9 is shown with an input pattern array $X_{in}$ of five input parameters and a look-back window of three time intervals between the time points $t_p$ to −3. The look-back portion or sub-matrix $D_{lb}(t)$ is a three-dimensional collection of learned sequential pattern matrices that contains data from five input parameters (1-5), seven primary time points each on its own sequential pattern matrix a to g, and four look-back time points or reference vectors $t_p$ to −3 on each sequential pattern matrix a to g. The look-ahead portion or sub-matrix $D_{la}(t)$ is a three-dimensional collection of learned sequential pattern matrices that contains data from five input parameters (1-5), seven learned sequential pattern matrices a to g each with its own primary time point, and two future or succeeding time points or vectors +1 and +2. The resulting weight vector, generated by the operations within the two sets of brackets, is multiplied by the look-ahead collection of learned sequential pattern matrices $D_{la}(t)$ to create an estimate matrix $Y_{la}$ that extrapolates in time. In this example, two extrapolated estimate vectors +1 and +2 are calculated for estimate matrix $Y_{la}$, representing the time points that are one and two time steps $\Delta t$ into the future. As described above with the vector-based equation (FIG. 5), the weight vector can also be multiplied by the full collection of learned sequential pattern matrices $D_a(t)$ that includes both $D_{la}(t)$ and $D_{lb}(t)$ to generate estimate matrices $X_{lb}$ and $Y_{la}$ within an estimate matrix $XY_{e1}$ that contains estimate data for past, current, and future time points (depicted in FIG. 10).

Figure 8:
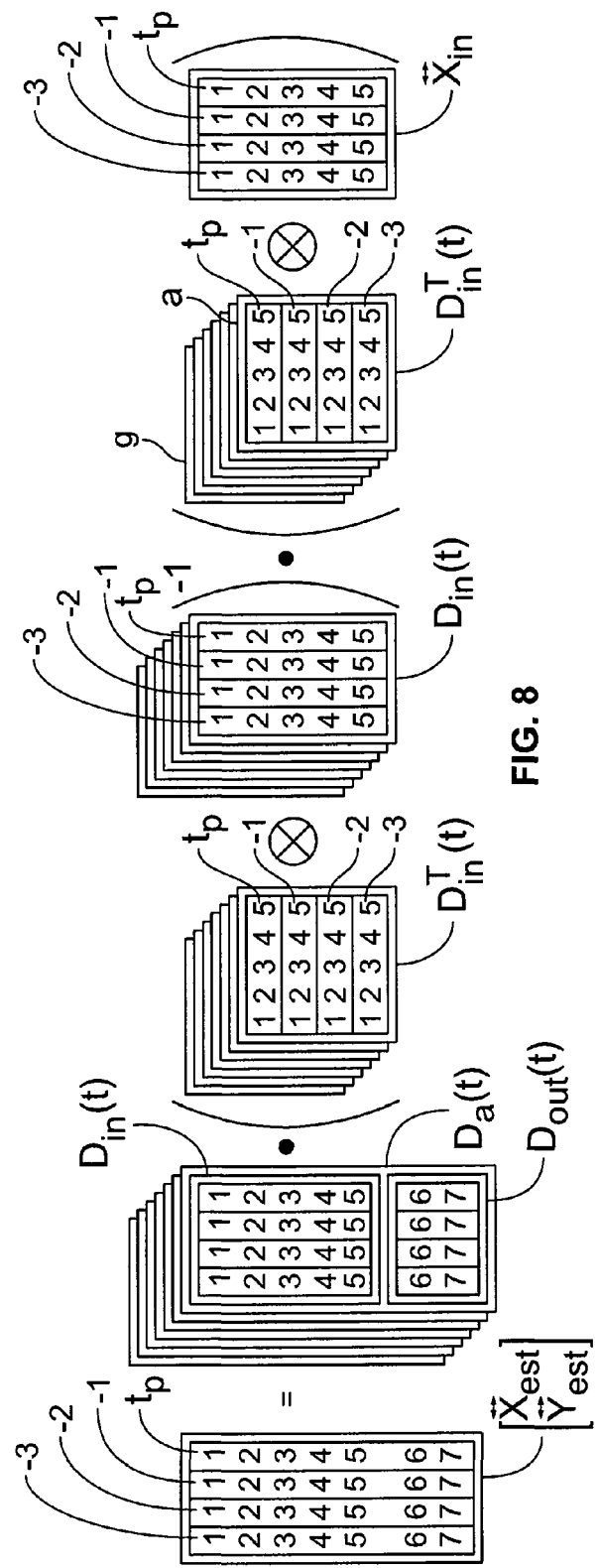
FIG. 8 is a schematic diagram of another form of the inferential sequential similarity based modeling equation that extrapolates in the modeled parameter dimension.
Figure 11:
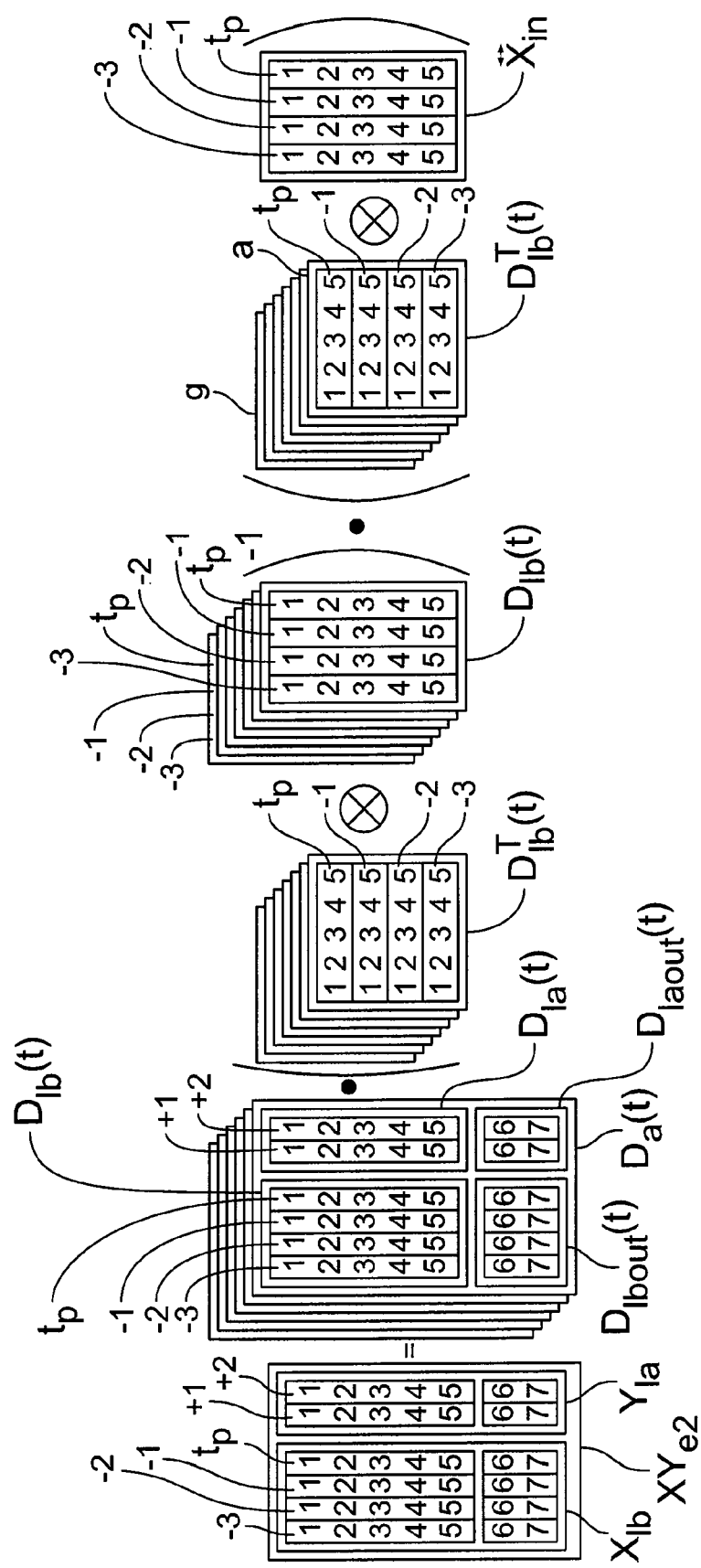
FIG. 11 is a schematic diagram of an inferential sequential similarity based modeling equation that extrapolates in the time dimension and the modeled parameter dimension.

Comparing the illustrations in FIGS. 9 and 10 to those in FIGS. 7 and 8, the matrix calculations within the brackets of all four figures are identical. This means that the calculation of the weight vector for an inferential model that extrapolates in the time dimension is identical to that for an inferential model that extrapolates along the dimension of the modeled parameters. The two forms of inferential modeling differ only by the data that are included in the full collection of learned sequential pattern matrices. A model that includes data for time points that are in the future relative to the primary time points extrapolates into the future. A model that includes data for parameters that are not in the input data stream extrapolates into these parameters. Referring to FIG. 11, an inferential model that extrapolates into both the time and modeled parameter dimensions is shown. Its three-dimensional collection of learned sequential pattern matrices $D_a(t)$ is an aggregate matrix composed of four sub-matrices separated along the modeled parameter and time dimensions. Its sub-matrices contain data for the look-back window of the input parameters $D_{lb}(t)$, data for the look-ahead window of the input parameters $D_{la}(t)$, data for the look-back window of the output (inferred) parameters $D_{lbout}(t)$, and data for the look-ahead window of the output (inferred) parameters $D_{laout}(t)$. The calculations generate estimate matrices $X_{lb}$ and $Y_{la}$ within an estimate matrix $XY_{e2}$ that contains estimate data for past, current, and future time points (depicted in FIG. 10) for both input and output (inferred) parameters.

Each of the various forms of kernel regression modeling with sequential pattern arrays described above produces an estimate matrix of model estimate data. In one example, estimate matrix $X_{est}$ is formed for each input pattern array $X_{new}$ (FIG. 6). As understood from the examples described above, in addition to the estimate vector corresponding to the current time point, the estimate matrix contains vectors for each of the time points in the look-back and/or look-ahead windows. The number of sequential vectors in the estimate matrix depends on the form of the modeling equation (autoassociative or inferential) and the number of time points $n_{lb}$ in the look-back window and the number of time points $n_{la}$ in the look-ahead window. As system time progresses, each fixed time point along the timeline accumulates multiple estimate vectors as the input pattern array reaches, moves through, and past the time point. The total number of estimate vectors that will be calculated for a fixed moment in time equals the total number of sequential patterns (vectors) in the sequential pattern matrix and analyzed by the model. For an autoassociative model or an inferential model that extrapolates along the parameter dimension, this total number is given by $n_{lb}+1$, corresponding to an estimate vector for each pattern in the look-back window and an estimate vector for the primary (current) time point. For an inferential model that extrapolates along the time dimension, this total number is given by $n_{lb}+1+n_{la}$, corresponding to an estimate vector for each pattern in the look-back and look-ahead windows and an estimate vector for the primary (current) time point.

Because multiple estimate vectors are calculated for a fixed point in time, utilizing sequential kernel regression models to feed algorithms for financial diagnostics or forecasting is complicated by the fact that many of these algorithms expect that only a single estimate vector exists for a time point. The simplest means of dealing with the multiple estimate vectors is to simply designate less than all of the multiple vectors in the estimate matrix as the source of the model estimates and to ignore any others. In one form, only one of the estimate vectors from each estimate matrix is selected for further diagnostic analysis. Typically, this means that the estimate vector in the estimate matrix selected for a fixed, arbitrary point in time $t_i$ while looking across multiple estimate matrices is the one generated when that time point becomes the current time point ($t_i=t_{cur}$) or in other words, the most recent time point ($t_p$ in the example estimate matrices of FIGS. 6 to 8). As the input pattern window moves past $t_i$, and $t_i$ becomes part of the look-back window to the new current time point, new estimate data calculated for $t_i$ are ignored. In other words, the older or preceding vectors relative to the current vector $t_p$ in the estimate matrix are ignored.

Other, more complex methods can be used to produce or select a single estimate vector for each fixed time point across multiple estimate matrices, while taking advantage of the information in the multiple vectors. Such methods include, but are not limited to, an average; weighted average; other weighted norms (2-norm and p-norm); maximum, minimum or median value, and so forth. The estimate vector chosen for diagnostic analysis could also be the vector with the greatest similarity to its corresponding input vector, and may use a similar similarity equation as that used to determine the weight vector. It will also be understood these methods can be applied to provide a single estimate vector for each estimate matrix to represent multiple sequential time points within the estimate matrix rather than a single fixed time point across multiple estimate matrices.

For an inferential model that extrapolates in the time dimension, a forecasting module 34 (FIG. 1) can use the future estimate matrix $X_{la}$ to feed forecasting algorithms, such as calculations of the time to reach a specified future state or condition of the financial system being monitored. This is based on the fact that the sequence of extrapolated estimates of a modeled parameter is a trend-line that predicts the future behavior of the modeled parameter. As system time progresses and new input pattern arrays are formed containing new primary vectors, new future estimate matrices are calculated. Like the other kernel regression models described above, the new estimate matrices substantially overlap previous matrices, meaning that multiple estimate values are produced for each parameter at each time point.

Also similar to the other kernel regression models, the inferential time extrapolating model can use various methods devised to reduce the multiple estimate values that are calculated at a fixed time point to a single value suitable for trending of the parameter. The simplest method is to select the most-recently calculated estimate matrix to supply the estimate data at each of the time points in the look-ahead window. Specifically, for a fixed time point $t_i$ well into the future, an estimate vector will be generated for it when the look-ahead pattern window first reaches it: $t_i=t_{cur}+n_{la}*\Delta t$. At each succeeding time step as the look-ahead window passes through the fixed point, a new estimate vector is calculated for it, which replaces the last vector. Thus, all of the estimate vectors are used to build a trend line, and the results for each time point (or fixed point) represented by estimate vectors are constantly being updated by the more recent estimate values to correspond to vectors as they pass through the look-ahead window used to build the estimate matrices.

Besides being simple, this approach produces parameter trends that react quickly to dynamic changes since only the most-recently calculated estimate matrix is used. Since estimate data in the trend-lines are replaced for each succeeding time step, the trends are susceptible to random fluctuations. This means that the trend value at a fixed time point can vary dramatically between successive time steps. Other more complex methods, such as average, weighted average, or other weighted norms, utilize two or more, or all, of the estimate values calculated at a fixed time point across multiple estimate matrices to produce a single estimate value for it. Trend lines produced by these methods are smoother, but less responsive to rapid dynamic changes. In addition to the above methods, which are designed to produce trend-lines representative of expected system behavior, other trend-lines can be produced that indicate the range of possible behaviors. For instance, a trend-line that connects the maximum estimate values at each future time point coupled with a trend-line connecting the minimum estimate values, bound the results produced by the model.

Returning again to FIG. 1, the full estimate matrix $X_{est}$ or a single representative estimate vector, as described above, is passed to differencing engine 20. The differencing engine subtracts the estimate matrix from the input pattern array ($X_{in}$ or $X_{new}$) or it subtracts the representative estimate vector from the current time point's input vector. Specifically, each selected estimate value from the estimate matrix is subtracted from a corresponding input value from the input pattern array. This array of residual vectors or a single representative residual vector is then provided to the alert module 22. Alert module 22 applies statistical tests to the residual data to determine whether the estimate and input data are statistically different. The alert module 22 performs any of a variety of tests to detect anomalous behavior of the financial system. This may include a rules engine for assessing rules logic using one or more residual values. The rules can be of any of a variety of commonly used rules, from simple univariate threshold measures, to multivariate and/or time series logic. Furthermore, the output of some rules may be the input to other rules, as for example when a simple threshold rule feeds into a windowed alert counting rule (e.g., x threshold alerts in y observations). Furthermore, statistical techniques may be used on the residual data to derive other measures and signals, which themselves can be input to the rules. Applicable statistical analyses can be selected from a wide variety of techniques known in the art, including but not limited to moving window statistics (means, medians, standard deviations, maximum, minimum, skewness, kurtosis, etc.), statistical hypothesis tests (for example, Sequential Probability Ratio Test (SPRT)), trending, and statistical process control (for example, CUSUM, S-chart).

The alert module 22 may determine that any differences between the estimate and input data are due to the normal system behavior that was not encountered during training. In this case, parameter data indicative of the new system behavior are provided to the optional adaptation module 30, which incorporates that data into the learning of model 14 via library 18, for example. In addition, adaptation module 30 may optionally perform its own automated tests on the data and/or residual analysis results to determine which input vectors or input arrays should be used to update the model 14.

The process of adapting a model comprises adding parameter data indicative of the new system behavior to the set of reference data in the library H from which the original kernel-based model was "trained". In the simplest embodiment, all reference data are used as the model exemplars, and therefore adapting a model means adding the new parameter data to the exemplar set of the model. Since sequential kernel regression models operate on sequences of observation vectors by design, new operating data added to the reference data must consist of a sequence of observation vectors. The minimum number of vectors added during any adaptation event equals the total number of sequential patterns (vectors) analyzed by the model. As described above, this total number is given either by $n_{lb}+1$ for an autoassociative model or an inferential model that extrapolates along the parameter dimension, or by $n_{lb}+1+n_{la}$ for an inferential model that extrapolates along the time dimension. If a training method has been used to down-select the reference observations to a subset stored as "representative" of system dynamics as described above for forming the three-dimensional collection of learned sequential pattern matrices D(t), then the new sequence of observation vectors (or in other words the entire input pattern array) is added to the original reference dataset, and the down-selection technique is applied to derive a new representative exemplar set, which should then include representation of the new observations. It is also possible to merely add the new sequence to a down-selected set of learned pattern arrays, without rerunning the down-selection technique. Furthermore, in that case, it may be useful to remove some learned pattern arrays from the model so that they are effectively replaced by the new data, and the model is kept at a manageable size. The criteria for which old learned pattern arrays are removed can include clustering and similarity determinations using equations described above which compare the observations at the new primary time points to the observations at old primary time points and replace those sequential pattern arrays most like the new sequential pattern arrays.

It will be appreciated by those skilled in the art that modifications to the foregoing embodiments may be made in various aspects. Other variations clearly would also work, and are within the scope and spirit of the invention. The present invention is set forth with particularity in the appended claims. It is deemed that the spirit and scope of that invention encompasses such modifications and alterations to the embodiments herein as would be apparent to one of ordinary skill in the art and familiar with the teachings of the present application.

What is claimed is:

1. A monitoring system for determining the future behavior of a financial system, comprising:
    an empirical model module configured to:
        by at least one processor, receive reference data that indicates the normal behavior of the system,
        by the at least one processor, receive input multi-dimensional pattern arrays, each input pattern array having a plurality of input vectors, each input vector representing a time point and having input values representing a plurality of parameters indicating the current behavior of the system obtained from one or more first sensors, each input vector arranged and maintained in a predetermined and ordered time relationship with the others, and
        generate estimate values, by the at least one processor, based on a calculation that uses an input pattern array and the reference data to determine a similarity measure between the input values and reference data, the similarity measure accounting for the predetermined and ordered time relationship, wherein the estimate values are in the form of an estimate matrix that includes at least one estimate vector of inferred estimate values for at least one future point in time or a plurality of second sensors being different from the one or more first sensors, each estimate vector arranged and maintained in the predetermined and ordered time relationship with the others, the reference data being grouped in equal-sized training arrays including reference vectors, such that each reference vector in any training array is arranged and maintained in the predetermined and ordered time relationship with the others, and such that the generating does not destroy any time information of the estimate matrix or the reference data; and
    a forecasting module configured to use the inferred estimate values to determine a future condition of the system.

2. The system of claim 1 wherein the empirical module is configured to generate weight values by using the similarity measures, and uses the weight values in a calculation with the reference data to generate the estimate matrix.

3. The system of claim 1 wherein the forecasting module is configured to use the most recent estimate matrix to update the estimate values for use to determine the future behavior of the system.

4. The system of claim 1 wherein the forecasting module is configured to provide values for a single estimate vector to represent a single time point across multiple estimate matrices.

5. The system of claim 1 wherein the forecasting module is configured to provide values for a single estimate vector to represent each estimate matrix.

6. The system of claim 1 wherein the forecasting module is configured to form a trend line for at least one parameter represented by the inferred estimate values to indicate the expected behavior of the object.

7. The system of claim 6 wherein the forecasting module is configured to form a new trend line with each new estimate matrix.

8. The system of claim 6 wherein the forecasting module is configured to form boundary trend lines to define a range of expected behavior of the object.

9. The system of claim 7 wherein the forecasting module is configured to form an upper boundary trend line with maximum estimate values from the time points, and a lower boundary trend line with minimum estimate values from the time points.

10. A method for determining the future behavior of a financial system, the method comprising:
   receiving reference data that indicates the normal behavior of the financial system;
   receiving input multi-dimensional pattern arrays, each input pattern array having a plurality of input vectors, each input vector representing a time point and having input values representing a plurality of parameters indicating the current behavior of the system obtained from one or more first sensors, each input vector arranged and maintained in a predetermined and ordered time relationship with the others;
   generating, by at least one processor, estimate values based on a calculation that uses an input pattern array and the reference data to determine a similarity measure between the input values and reference data, the similarity measure accounting for the predetermined and ordered time relationship, wherein the estimate values are in the form of an estimate matrix that includes at least one estimate vector of inferred estimate values for at least one future point in time or a plurality of second sensors being different from the one or more first sensors, each estimate vector arranged and maintained in the predetermined and ordered time relationship with the others, the reference data being grouped in equal-sized training arrays including reference vectors, such that each reference vector in any training array is arranged and maintained in the predetermined and ordered time relationship with the others, and such that the generating does not destroy any time information of the estimate matrix or the reference data; and
   determining a future condition of the financial system using the inferred estimate values.

11. The method of claim 10 further comprising generating weight values by using the similarity measures, and using the weight values in a calculation with the reference data to generate the estimate matrix.

12. The method of claim 10 further comprising updating the estimate values for use to determine the future behavior of the system according to the most recent estimate matrix.

13. The method of claim 10 wherein the forecasting module is configured to provide values for a single estimate vector to represent a single time point across multiple estimate matrices.

14. The method of claim 10 further comprising providing values for a single estimate vector to represent each estimate matrix.

15. The method of claim 10 further comprising forming a trend line for at least one parameter represented by the inferred estimate values to indicate the expected behavior of the object.

16. The method of claim 15 further comprising forming a new trend line with each new estimate matrix.

17. The method of claim 15 further comprising forming boundary trend lines to define a range of expected behavior of the object.

18. The method of claim 16 further comprising forming an upper boundary trend line with maximum estimate values from the time points, and a lower boundary trend line with minimum estimate values from the time points.

19. An apparatus for determining the future behavior of a financial system, the apparatus comprising:
   an interface with an input and an output, the input configured to receive reference data that indicates the normal behavior of the financial system, the input further configured to receive multi-dimensional input pattern arrays, each input pattern array having a plurality of input vectors, each input vector representing a time point and having input values representing a plurality of parameters indicating the current behavior of the system obtained from one or more first sensors, each input vector arranged and maintained in a predetermined and ordered time relationship with the others; and
   at least one processor coupled to the interface, the at least one processor being configured to generate estimate values based on a calculation that uses an input pattern array and the reference data to determine a similarity measure between the input values and reference data, the similarity measure accounting for the predetermined and ordered time relationship, wherein the estimate values are in the form of an estimate matrix that includes at least one estimate vector of inferred estimate values for at least one future point in time or a plurality of second sensors being different from the one or more first sensors, each estimate vector arranged and maintained in the predetermined and ordered time relationship with the others, the reference data being grouped in equal-sized training arrays including reference vectors, such that each reference vector in any training array is arranged and maintained in the predetermined and ordered time relationship with the others, and such that the generating does not destroy any time information of the estimate matrix or the reference data, the processor configured to determine a future condition of the system using the inferred estimate values and provide the future condition at the output.

* * * * *

UNITED STATES PATENT AND TRADEMARK OFFICE
CERTIFICATE OF CORRECTION

PATENT NO. : 9,235,208 B2
APPLICATION NO. : 13/646367
DATED : January 12, 2016
INVENTOR(S) : Herzog Page 1 of 1

It is certified that error appears in the above-identified patent and that said Letters Patent is hereby corrected as shown below:

In the Specification

In Column 5, Line 50, delete "weights" and insert -- weights $c_i$, --, therefor.

In Column 6, Line 4, delete "vest." and insert -- $y_{est.}$ --, therefor.

In Column 12, Line 32, delete "where $X_{new}$ is an input pattern array and $X_i$," and insert -- where $\overline{X}_{new}$ is an input pattern array and $\overline{X}_i$ --, therefor.

In Column 14, Line 7, delete "Savitsky-Golay" and insert -- Savitzky–Golay --, therefor.

Signed and Sealed this
Second Day of August, 2016

Michelle K. Lee
*Director of the United States Patent and Trademark Office*